(12) United States Patent
Lenser et al.

(10) Patent No.: US 12,623,206 B2
(45) Date of Patent: May 12, 2026

(54) COOLING METHODS FOR ULTRASONIC FORMING AND BONDING OF POLYMERIC WEBS

(71) Applicant: The Procter & Gamble Company, Cincinnati, OH (US)

(72) Inventors: Todd Douglas Lenser, Liberty Township, OH (US); Randall Allen Myers, Fairfield, OH (US); Gerald F. Rocha, Bedford, NH (US); Nicholas G. Lehoullier, Goffstown, NH (US)

(73) Assignee: The Procter & Gamble Company, Cincinnati, OH (US)

( * ) Notice: Subject to any disclaimer, the term of this patent is extended or adjusted under 35 U.S.C. 154(b) by 462 days.

(21) Appl. No.: 18/301,300

(22) Filed: Apr. 17, 2023

(65) Prior Publication Data

US 2023/0330630 A1     Oct. 19, 2023

Related U.S. Application Data

(60) Provisional application No. 63/331,935, filed on Apr. 18, 2022.

(51) Int. Cl.
| | |
|---|---|
| *B23K 20/10* | (2006.01) |
| *B01J 20/30* | (2006.01) |
| *B01J 20/34* | (2006.01) |
| *B29C 65/08* | (2006.01) |

(52) U.S. Cl.
CPC ....... *B01J 20/3078* (2013.01); *B01J 20/3441* (2013.01); *B23K 20/106* (2013.01); *B29C 65/086* (2013.01)

(58) Field of Classification Search
CPC ........................... B29C 65/086; B23K 20/106
See application file for complete search history.

(56) References Cited

U.S. PATENT DOCUMENTS

| | | | | |
|---|---|---|---|---|
| 5,397,407 A | * | 3/1995 | D'Addario | ........ B29C 66/43123 228/110.1 |
| 5,545,275 A | | 8/1996 | Herrin et al. | |
| 6,691,909 B2 | * | 2/2004 | Skogsmo | ............. B23K 20/106 228/111.5 |
| 8,745,827 B2 | | 6/2014 | Rocha | |

(Continued)

FOREIGN PATENT DOCUMENTS

| | | |
|---|---|---|
| DE | 10250741 A1 | 5/2004 |
| FR | 3053909 A3 | 1/2018 |
| WO | 2018006946 A1 | 1/2018 |

OTHER PUBLICATIONS

Extended EP Search Report and Search Opinion for 23168292.3 dated Jul. 14, 2023, 8 pages.

(Continued)

*Primary Examiner* — Xiao S Zhao
*Assistant Examiner* — Nicholas J Chidiac
(74) *Attorney, Agent, or Firm* — Gregory P. Habiak; Christian M. Best

(57) ABSTRACT

Methods and apparatuses for manufacturing portions of absorbent articles may include or facilitate conveying a substrate through a nip formed between a first device and a second device, transmitting vibrational energy from the second device toward the first device via the nip to alter the substrate, and cooling the second device by transferring thermal energy from the second device.

21 Claims, 15 Drawing Sheets

(56) References Cited

U.S. PATENT DOCUMENTS

| | | | |
|---|---|---|---|
| 8,784,722 B2* | 7/2014 | Rocha | A44B 18/0049 |
| | | | 264/444 |
| 9,265,673 B2 | 2/2016 | Stabelfeldt et al. | |
| 9,265,674 B2 | 2/2016 | Hancock-cooke et al. | |
| 9,282,790 B2 | 3/2016 | Rocha et al. | |
| 9,795,194 B2 | 10/2017 | Rocha | |
| 10,076,162 B2 | 9/2018 | Rocha | |
| 10,159,313 B2 | 12/2018 | Rocha et al. | |
| 10,405,614 B2 | 9/2019 | Rocha | |
| 10,798,997 B2 | 10/2020 | Rocha | |
| 10,953,592 B2 | 3/2021 | Rocha | |
| 10,981,321 B2 | 4/2021 | Rocha | |
| 11,058,186 B2 | 7/2021 | Rocha | |
| 11,292,209 B2* | 4/2022 | Solenthaler | B29C 65/08 |
| 2003/0066863 A1* | 4/2003 | Skogsmo | B23K 20/106 |
| | | | 228/111.5 |

| | | | |
|---|---|---|---|
| 2010/0180407 A1* | 7/2010 | Rocha | B29C 59/04 |
| | | | 264/444 |
| 2019/0224054 A1 | 7/2019 | Silfverstrand et al. | |
| 2019/0387846 A1 | 12/2019 | Rocha | |
| 2020/0086586 A1* | 3/2020 | Solenthaler | B29C 66/81429 |
| 2020/0179184 A1 | 6/2020 | Kaiser | |
| 2022/0106714 A1 | 4/2022 | Schneider et al. | |

OTHER PUBLICATIONS

Unpublished U.S. Appl. No. 18/329,630, filed Jun. 6, 2023, Todd Douglas Lenser et al.
Unpublished U.S. Appl. No. 18/451,145, filed Aug. 17, 2023 to Todd Douglas Lenser et al.
All Office Actions; U.S. Appl. No. 18/301,294, filed Apr. 17, 2023.
Unpublished U.S. Appl. No. 18/301,294, filed Apr. 17, 2023, to Todd Douglas Lenser et al.

* cited by examiner

COOLING METHODS FOR ULTRASONIC FORMING AND BONDING OF POLYMERIC WEBS

CROSS REFERENCE TO RELATED APPLICATION

This application claims the benefit of U.S. Provisional Application No. 63/331,935, filed Apr. 18, 2022, the entire disclosure of which is incorporated herein by reference.

FIELD

The present disclosure relates generally to forming and bonding substrates via vibrational energy and more specifically relates to cooling methods and apparatuses for ultrasonic forming and bonding of substrates.

BACKGROUND

The discussion of shortcomings and needs existing in the field prior to the present disclosure is in no way an admission that such shortcomings and needs were recognized by those skilled in the art prior to the present disclosure.

Sources of vibration energy in combination with an anvil may be used to create bonds in substrates conveyed therebetween and/or to create surface features in substrates conveyed therebetween. Surface features may include projections or hooks, as may be useful in hook and loop fasteners.

More specifically, sources of vibration energy in combination with an anvil may be used to create bonds in substrates conveyed therebetween. Examples of substrates bonded together by sources of vibration energy in combination with an anvil may include but are not limited to nonwoven materials and films of various types, which will be discussed in greater detail hereinafter. Bonds may be formed between nonwoven-nonwoven, film-nonwoven, or film-film. The sources of vibration energy may use ultrasonic energy. The source of vibration energy may press against the substates to melt, to soften, and/or to deform a portion of the substrates where a bond is desired. The anvil may have a bonding nub around which the substrates are melted. The bonded substrates may have many uses, including but not limited to components of absorbent articles.

Additionally or alternatively, sources of vibration energy in combination with an anvil with a plurality of projection recesses formed therein may be used to create projections or hooks in substrates conveyed therebetween. Examples of substrates include but are not limited to films and/or nonwoven materials. These sources of vibration energy may use ultrasonic energy. To form the projections or hooks, the substrate(s) may be conveyed through a nip between a source of vibration energy and an anvil with a plurality of projection recesses defined therein. The source of vibration energy presses against the substrate to melt, to soften, and/or to deform a portion of the substate into a deformable film that may flow, stretch, and/or otherwise deform into the plurality of projection recesses. The substrate(s) may then be moved out of the nip and the substrate may be removed from the anvil, resulting in a substrate having a plurality of projections or hooks in some regions, melted substrate around the projections or hooks, and/or normal nonwoven or film in other regions (non-melted regions). The plurality of projections may form one side of a touch fastener for an absorbent article.

Without being bound by theory, vibration energy may create a polymer flow or deformation into the projection recesses and/or against the nubs by heating a nonwoven and/or film via hysteresis losses from repeated compression and expansion of the polymer material in response to the vibration energy. A sonotrode, or ultrasound horn, may press against the polymer material with sinusoidal motion of the working surface of several tens of microns amplitude and a frequency of typically 20-40 kHz. Due primarily to high shear rates from high frequency compression, and aided by elevated temperature, the polymers exhibit shear thinning and flow more easily due to a lower apparent viscosity. The process is inherently inefficient, which may be due to impedance mismatches between the titanium or aluminum sonotrode and the low modulus polymer. Some sources suggest that only about 12% of the applied energy goes into melting the polymer. Due to the high cycle rate, sonotrodes for continuous duty nonwoven or film applications are typically titanium, which has excellent fatigue resistance, but poor thermal diffusivity.

Unsatisfactory results, including rips, tears, and holes in bonded or formed substrates have limited the applicability of ultrasonic bonding and forming processes at the high throughputs and line speeds required in the absorbent article industry, and other industries. A need, therefore, exists for methods and devices useful for ultrasonic forming and bonding of substrates in the absorbent article industry, and other industries.

SUMMARY

Various embodiments solve the above-mentioned problems and provide methods and devices useful for ultrasonic forming and bonding of substrates in the absorbent article industry.

Various embodiments relate to a method of manufacturing portions of absorbent articles comprising conveying a substrate through a nip formed between a first device and a second device, transmitting vibrational energy from the second device toward the first device via the nip to alter the substrate, providing a projection extending from the second device, cooling the second device by transferring thermal energy from the second device to the projection, and conveying a chilled fluid over the projection to cool the projection. The projection may be in thermal communication with the second device and may be positioned proximate to a working surface of the second device. In addition to providing the projection or as an alternative thereto, various embodiments relate to a method that may comprise providing a cavity in the second device proximate to a working surface of the second device, conveying a chilled fluid through the cavity. and cooling the second device by transferring thermal energy from the second device to the chilled fluid.

Various embodiments relate to an apparatus for altering a substrate for an absorbent article, comprising a first device, a second device configured to transmit vibrational energy toward a nip formed between the second device and the first device, and a projection extending from the second device. The projection may be in thermal communication with the second device and may be positioned proximate to a working surface of the second device. The projection may be configured to cool a working surface of the second device while a substrate is conveyed through the nip to be altered by the vibrational energy. In addition to the projection or as an alternative thereto, various embodiments relate to an apparatus that may comprise a cavity in the second device proximate to a working surface of the second device. The cavity may be configured to convey a chilled fluid through the second device to cool a working surface of the second device while a substrate is conveyed through the nip to be altered by the vibrational energy.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1:
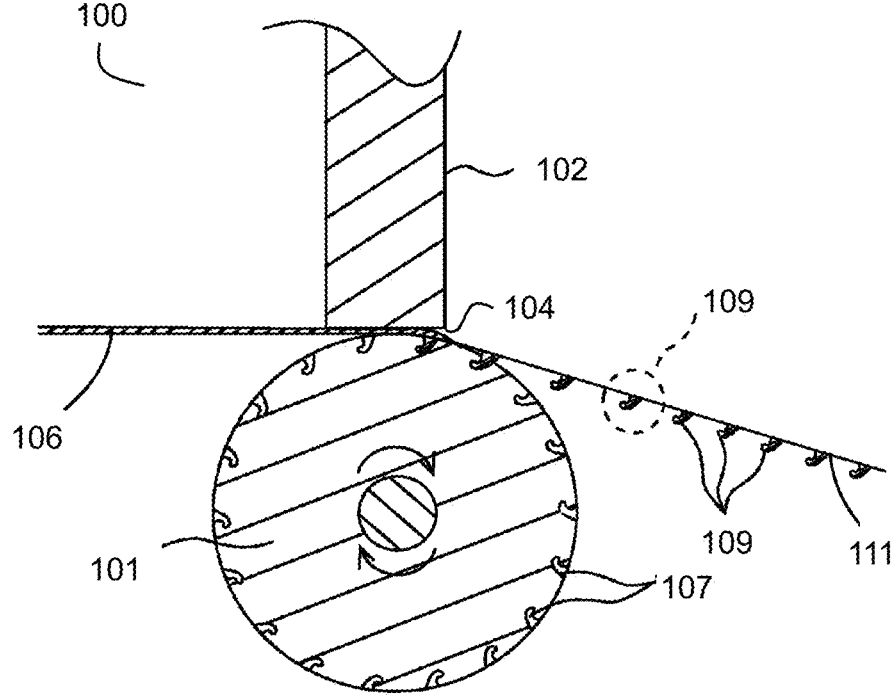
FIG. 1 is a schematic cross-sectional side view illustrating an example of an ultrasonic forming apparatus, which may benefit from the cooling methods according to various embodiments.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

In this specification and in the claims that follow, reference will be made to a number of terms that shall be defined to have the following meanings unless a contrary intention is apparent.

"Standard temperature and pressure" is used herein to generally refer to 25° C. and 1 atmosphere. Standard temperature and pressure may also be referred to as "ambient conditions." Unless indicated otherwise, parts are by weight, temperature is in ° C., and pressure is at or near atmospheric.

The terms "elevated temperatures" or "high temperatures" generally refer to temperatures of at least 100° C.

"Disposed on" is used herein to refer to a positional state indicating that one object or material is arranged in a position adjacent to the position of another object or material. The term does not require or exclude the presence of intervening objects, materials, or layers.

"Anvil roll" is used herein to refer to any industrial tool comprising an essentially cylindrical form having a pattern or profile on the outer circumferential surface. An anvil roll is on example of a "first device" according to various embodiments. The first device need not be but may be essentially cylindrical. A first device may be any desirable shape, including but not limited to concave, convex, or flat according to various embodiments.

"Absorbent article" is used herein to refer to consumer products whose primary function is to absorb and retain soils and wastes. "Diaper" is used herein to refer to an absorbent article generally worn by infants, children, and incontinent persons about the lower torso. "Diaper" may include taped diapers and pant-type diapers. The term "disposable" is used herein to describe absorbent articles which generally are not intended to be laundered or otherwise restored or reused as an absorbent article (e.g., they are intended to be discarded after a single use and may also be configured to be recycled, composted, or otherwise disposed of in an environmentally compatible manner).

"Elastic," "elastomer" or "elastomeric" are used herein to refer to materials exhibiting elastic properties, which include any material that upon application of a force to its relaxed, initial length can stretch or elongate to an elongated length more than 10% greater than its initial length and will substantially recover back to about its initial length upon release of the applied force.

"Joined" is used herein to encompass configurations whereby an element is directly secured to another element by affixing the element directly to the other element, and configurations whereby an element is indirectly secured to another element by affixing the element to intermediate member(s) which in turn are affixed to the other element.

"Substrate" is used herein to describe a material which is primarily two-dimensional (i.e., in an XY plane) and whose thickness (in a Z direction) is relatively small (i.e. 1/10 or less) in comparison to its length (in an X direction) and width (in a Y direction). Non-limiting examples of substrates include a web, layer or layers or fibrous materials, nonwovens, films, and foils such as polymeric films or metallic foils. These materials may be used alone or may comprise two or more layers laminated together. As such, a web is a substrate.

"Nonwoven" is used herein to refer to a material made from continuous (long) filaments (fibers) and/or discontinuous (short) filaments (fibers) by processes such as spunbonding, meltblowing, carding, and the like. Nonwovens do not have a woven or knitted filament pattern.

"Machine direction" (MD) is used herein to refer to the direction of material flow through a process. In addition, relative placement and movement of material can be described as flowing in the machine direction through a process from upstream in the process to downstream in the process.

"Cross direction" (CD) is used herein to refer to a direction that is generally perpendicular to the machine direction.

"Thermal conductivity" is used herein to refer to the quantity of heat transmitted due to a unit temperature gradient, in unit time under steady conditions in a direction normal to a surface of the unit area.

"Thermal diffusivity" is used herein to refer to the rate of transfer of heat of a material from the hot side to the cold side—a measure of how quickly a material can absorb heat from its surroundings. It can be calculated by taking the thermal conductivity divided by density and specific heat capacity at constant pressure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

General Context

FIG. 1 is a schematic cross-sectional side view illustrating an example of an ultrasonic forming apparatus, which may benefit from the cooling methods according to various embodiments. As shown in FIG. 1, the apparatus 100 may include a first device 101 and a second device 102 with a nip 104 formed therebetween. The first device 101 may be an anvil roll comprising multiple hook-shaped or otherwise shaped cavities 107, along an outer periphery thereof. The second device 102 may be a source of vibrational energy, such as a sonotrode or a vibrating ultrasonic horn.

A substrate 106 may be positioned or passed through the nip 104. The substrate 106 may be, but need not be limited to, a film, sheet, web, nonwoven, composite, laminate, or other form, or may be portions of a film, sheet, web, nonwoven, laminate or substrate thermoplastic material, portions of which may be used as a component of a touch fastener, for instance on a absorbent article. In their use on absorbent article, touch fasteners may be attached to a "side tab" or "ear" that the consumer uses to secure the absorbent article the wearer. These tabs may be constructed with a piece of extensible material to allow the side tab to stretch and flex when attached or when the wearer moves. The touch fasteners may also be used in a two-point fastening system on an absorbent article, where the component is positioned on a landing zone or outer cover of the absorbent article. The present disclosure further contemplates the use of preformed film, sheet, web, composite, laminate, etc. as a substrate material.

During operation, the second device 102 is positioned in close proximity to an outer surface of the rotating first device 101 and in contact with the substrate 106 being processed. The first device 101 may also be a flat plate in other forms with the substate moving over the flat plate. The second device 102 may be vibrated at frequencies between about 50 Hz to about 50 kHz, as required. A portion of the substrate 106 in contact with, or in proximity with, the first device 101 and second device 102 may be softened by the vibration energy from the second device 102 and a desired portion of the substrate may enter into the cavities 107 of the first device to be shaped into projections 109 on the front surface of the film or sheet 111 as the first device 101 rotates in the direction indicated in FIG. 1 by the arrows. This process may be referred to as rotary forming. Force may be exerted on the substrate 106 as it passes through the nip 104 to apply a requisite amount of pressure to the softened substrate 106 to assist its entry and filling of at least some of, or all of, the cavities 107. One example of the process is described in U.S. Pat. No. 8,784,722.

Figure 2:
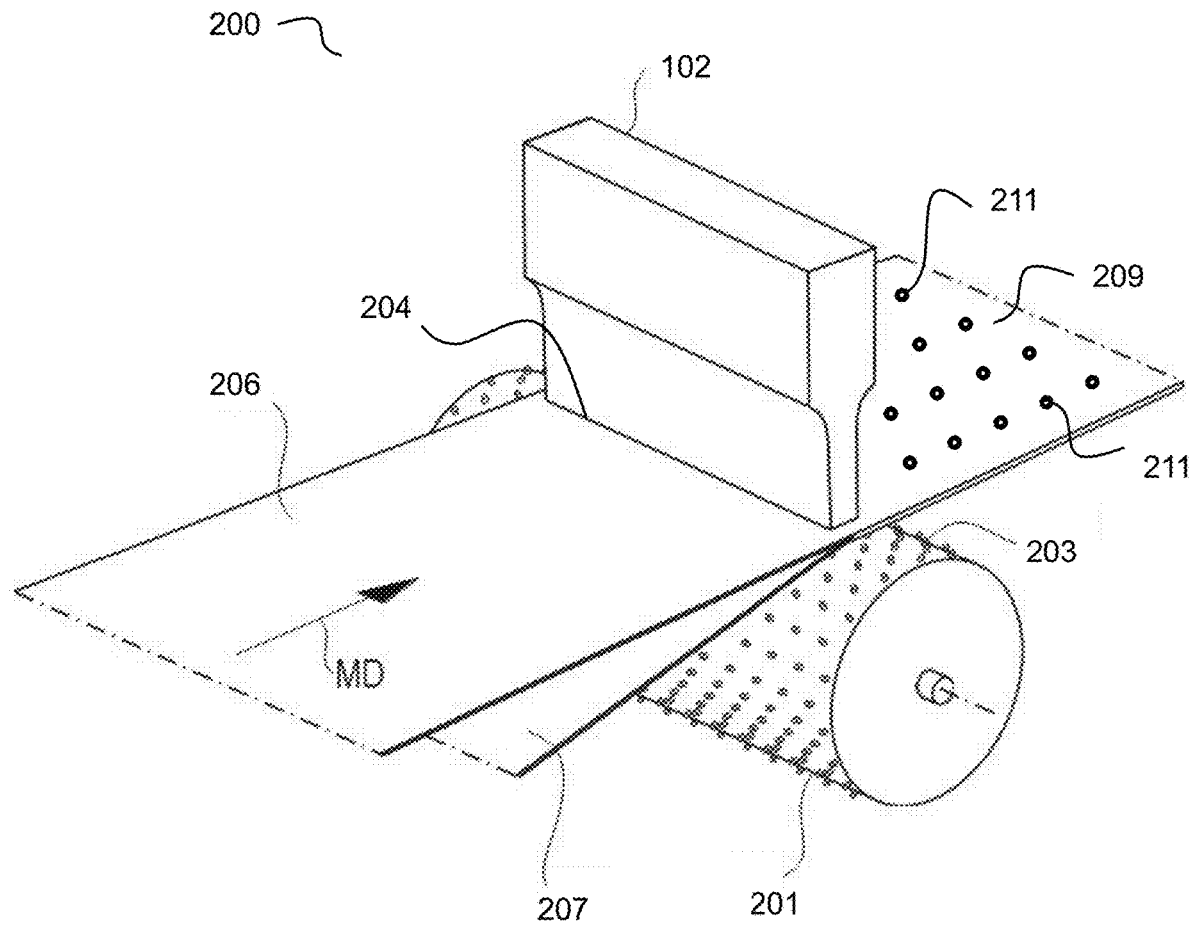
FIG. 2 is a schematic perspective view illustrating an example of an ultrasonic bonding apparatus, which may benefit from the cooling methods according to various embodiments.

FIG. 2 is a schematic view illustrating an example of an ultrasonic bonding apparatus 200, which may benefit from the cooling methods according to various embodiments. The apparatus 200 is somewhat similar to the apparatus 100 shown in FIG. 1 and all or some of the details discussed with respect to FIG. 1 apply to FIG. 2. The apparatus 200 comprises a first device 201 and a second device 102 positioned to form a nip 204 therebetween. The first device 201 may comprise an anvil roll comprising a plurality of nubs 203 positioned on an outer circumference. The second device may be identical to, or similar to, the second device 102 as described with reference to FIG. 1. One or more substrates, such as a first substrate 206 and/or a second substrate 207 may be positioned or passed through the nip 204 in a machine direction. During operation, the second device 102 is positioned in close proximity to the outer surface of the rotating first device 201 and in contact with, or in close proximately with, the substrates 206, 207 being processed. A portion of the substrates 206, 207 in contact with the first device 201 at the nubs 203 and the second device 102 may be softened by the vibration energy from the second device 202, thereby bonding the substrates 206, 207 together to form a bonded composite 209 comprising a plurality of bonds 211.

Discovery of Localized Overheating and Deformation

A serious need has been unexpectedly discovered for cooling methods and devices useful for ultrasonic forming and bonding of substrates. In this context, it has been discovered that the second device (for example, the sonotrode), which is normally stationary except for vibration, is susceptible to localized heating above the melting temperature of the polymer, which may lead to burn through in substrates where the second device may actually push through the molten polymer and directly contact the anvil. Equipment damage and substantial product quality defects such as large tears in substrates may occur in such cases. This burn-through problem limits the applied energy from a second device, such as a sonotrode, which in turn limits the line rate and throughput when making substrates. To process absorbent articles, and other goods, economically, very high line rates and throughputs are critical.

More specifically, it has been unexpectedly discovered that second devices, such as sonotrodes, may overheat in a small region adjacent to the projection or hook patch or bonded area. This localized overheating may lead to unintended melting, holes, and/or tears in the hook patch, or around the hook patch, or around bonded areas. It has further been discovered that this localized overheating may increase as line speed is increased. Frequent tears have been observed at the trailing edge of the hooks patch and sometimes tear outs of the entire patch have been observed.

Without being bound by theory, localized overheating appears to be influenced or caused by trade-offs between the fatigue life and the thermal conductivity when selecting a material or materials for construction of the second device. Other factors may also influence the thermal diffusivity of a particular second device, such as a particular sonotrode made from particular materials. These other factors may include but are not limited to the temperature, pressure, and composition of the surrounding air or environment, as well as the density of the sonotrode's structure. Comparisons between second devices, such as sonotrodes, comprising different materials should, therefore, be made between similar structures operating under similar environmental conditions.

Aluminum has a much higher thermal conductivity than does titanium. An aluminum sonotrode would not be expected to generate a hot spot over the hook patch or around bonded areas as readily as does a titanium sonotrode. As such, the present inventors would not expect tears when using an aluminum sonotrode based on modeling data. A trade-off exists, however, because aluminum has a limited fatigue life, and is normally not desired for sonotrodes in the nonwoven, film, and/or absorbent article industry, or other industries, which must operate at very high throughputs to be economical. The high throughputs required may severely shorten the life of a sonotrode with inadequate fatigue resistance.

In contrast to the hook/projection forming industry, most ultrasonic bonding processes on nonwovens, do not typically have this overheating problem until they are performed at high rates of speed. Ultrasonic bonding processes are typically used for bond patterns that are intermittent, typically at about 2% coverage. As used in this context, "coverage" refers to the percentage of material that is melted to form a bond between substrate layers. A typical bonding pattern for nonwoven materials is an 8 mm by 5 mm grid with a plurality of 0.5 mm interlayer bonds spaced throughout at a coverage of about 2% to about 5%. Components of absorbent articles, such as a patch comprising projections or hooks may have a much denser pattern. For example, projections or hooks for an absorbent article may cover a 30 mm machine direction by 20 mm cross direction patch of over 96% coverage of projections and hooks. As used in this context, "coverage" refers to the percentage of material that is melted to form a projection or a hook. In such applications, the energy density is much higher, and it has been discovered that a hot spot may form on or proximate to the working surface of the second device.

Figure 3:
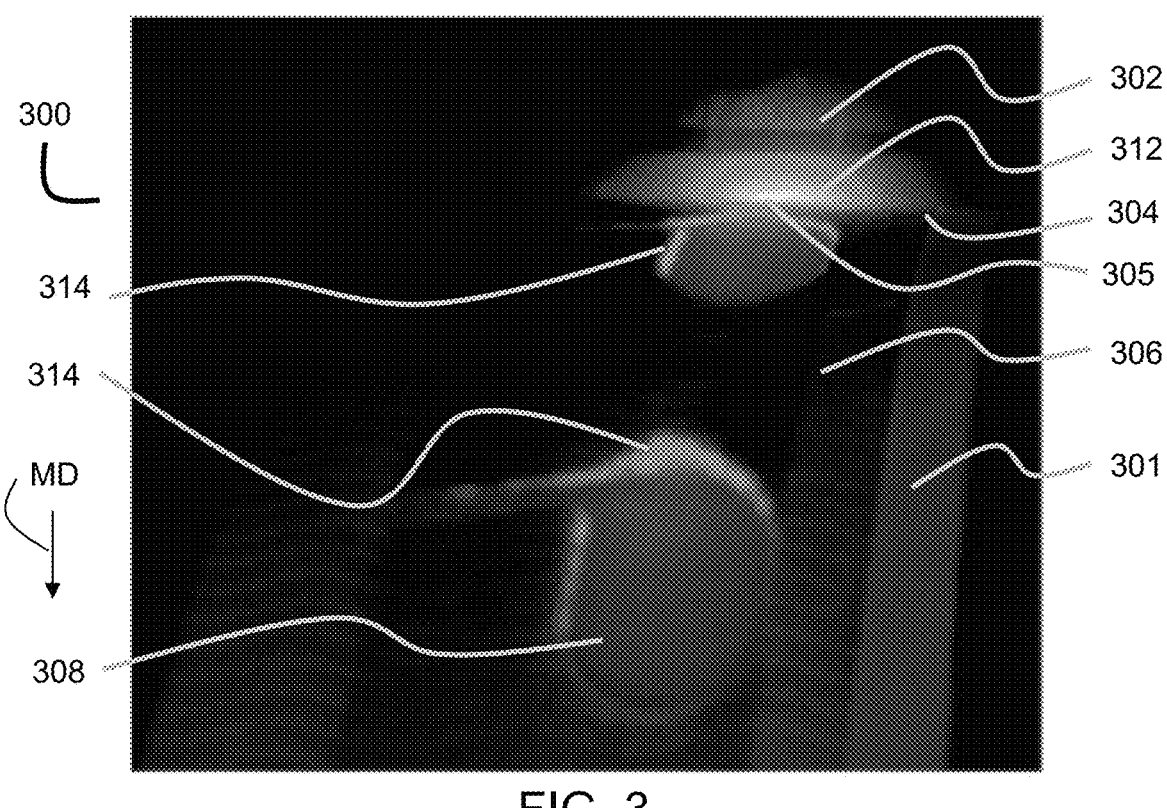
FIG. 3 is a still frame photograph from an infrared video observing an ultrasonic forming system.

FIG. 3 is a still frame photograph from an infrared video observing an ultrasonic bonding and forming system 300 for ultrasonic forming and bonding showing a substrate 306 (e.g., a landing zone for a taped absorbent article) passing through a nip 304 formed between a first device 301 and a second device 302 operating at ambient conditions. In the embodiment shown in FIG. 3, the first device 301 is a cylindrical rotating anvil and the second device 302 is titanium sonotrode. As the substrate 306 passes through the nip 304 in the machine direction a portion of the substrate 306 is heated and pressed against the first device 301 at a contact point 305 to fill cavities disposed at regular intervals along the outer circumference of the first device 301, thereby forming patches 308 of projections or hooks, which may be useful as a touch fastener in an absorbent article such as a diaper.

Still referring to FIG. 3, the original photograph includes an automatically generated gradient showing differing temperatures, in which black is less than 30 degrees Celsius, white is about 90 degrees Celsius. The gradient from low temperature to high temperature was automatically generated. A localized overheating region 312 is within about 8 mm to about 10 mm of the contact point 305 between the first device 301 (e.g., the anvil) and the second device 302 (e.g., the sonotrode). The localized overheating region 312 is characterized by an elevated temperature within a distance of the contact point 305. The elevated temperature of about 50 degrees Celsius or even about 70 degrees Celsius or up to about 150 to about 170 degrees Celsius, about 90 degrees Celsius to about 120 degrees Celsius, or about 100 degrees Celsius to about 110 degrees Celsius, specifically reciting all 1-degree Celsius increments within the above-recited ranges and all ranges formed therein or thereby. The distance may be within about 3 mm to about 15 mm of the contact point, specifically reciting all 0.1 mm increments within the above-recited ranges and all ranges formed therein or thereby. In other words, the localized overheating region is characterized by an elevated temperature of about 50 degrees Celsius or even about 70 degrees Celsius or up to about 150 to about 170 degrees Celsius within about 3 mm to about 5 mm of the contact point 305.

The localized overheating at region 312 causes excessive heating of the substate 306, especially at burn-through regions 314, which may also be referred to as tears, or holes. The tears, rips, holes, or burn-through regions are considered defects by consumers and are highly undesirable. In the specific example shown in FIG. 3, it was observed that the temperature of the localized overheating region 312 at time the burn-through regions 314 were caused was about 90 to about 120 degrees Celsius. The trailing edge material of the burn-through region 314 on the patch as measured on IR camera was about 100 to about 110 degrees Celsius at the time the burn-through regions 314 were caused.

Figure 4:
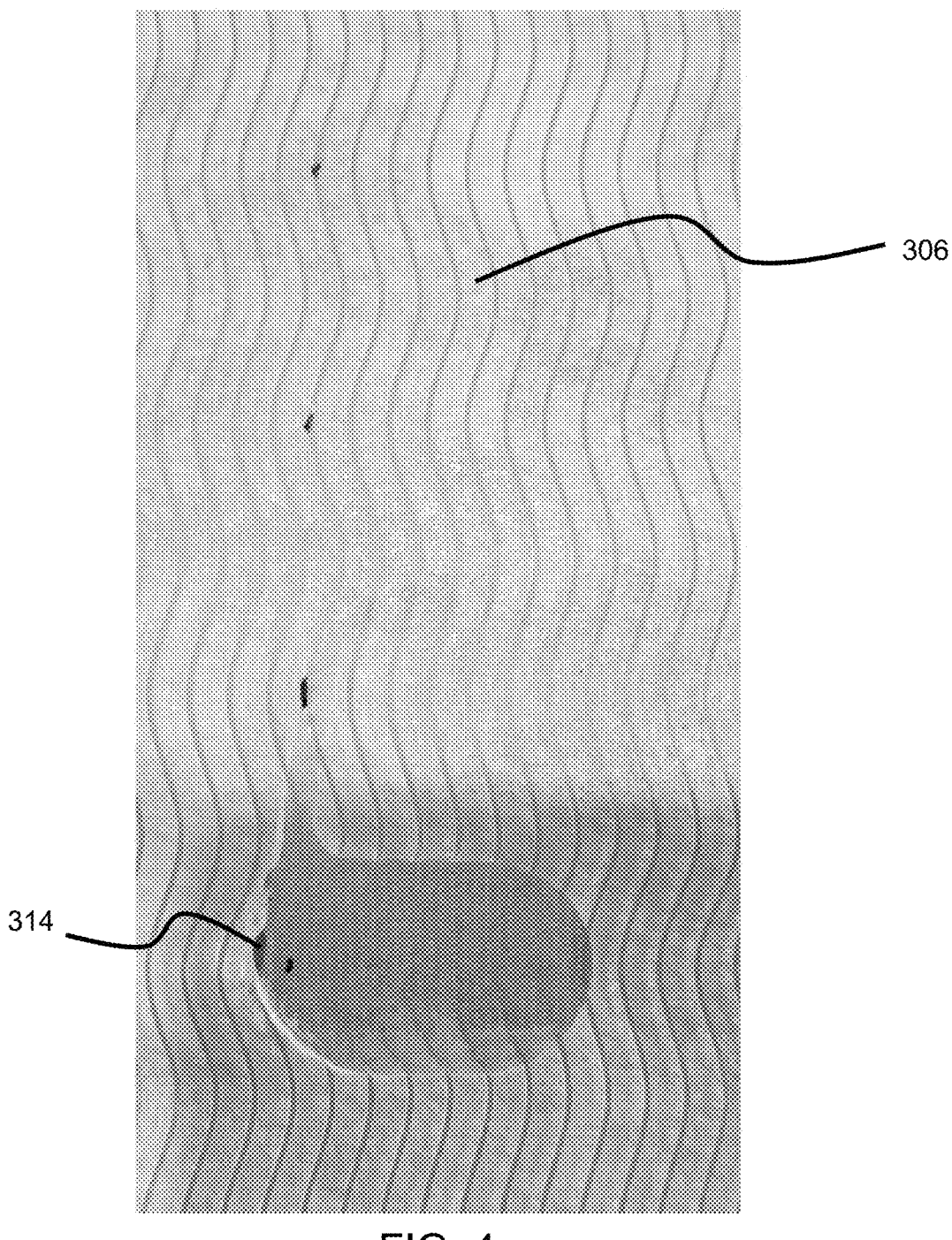
FIG. 4 is a photograph showing burn-through regions in the substrate from FIG. 3 after passing through the nip and being subjected to the localized overheating region.

FIG. 4 is a photograph showing burn-through regions 314 in the substrate 306 after passing through the nip 304 and being subjected to the localized overheating at the localized overheating region 312. The high-speed infrared video observations of the system 300 was the first evidence that the heating problem was one of localized heating in a small region of the sonotrode, i.e., the localized overheating region 312, about 20 mm wide, rather than heating of the entire 85 mm wide sonotrode.

It was further discovered that the localized heating of the second device also caused localized thermal deformation of the second device 302, which caused uneven and poor hook or projection formation. This poor quality was another major limiter of line speed.

The localized deformation of a titanium sonotrode at the localized overheating region was investigated in detail. The displacement of the sonotrode was large enough that hooks were no longer formed in the substrate. This deformation is believed to be in the range of about 10 microns to about 30 microns.

The specific titanium sonotrode observed had a characteristic length of 20 mm in the cross direction. It is noted that the coefficient of thermal expansion of titanium is $4.8 \times 10^{-6}$ m/(m-K). A peak temperature rise of about 140K was observed, which resulted in about a 13 micron CD length change manifesting as bowing of the sonotrode at the contact point. The degree of deformation was significant because the thickness of an example nonwoven substrate before passing through the nip is typically over 100 microns; the thickness of the nonwoven substrate after passing through the nip is about 50 microns, for regions outside of any hook formation region; and the thickness of the nonwoven substrate is only about 20 microns to 50 microns, or about 25 microns to about 45 microns after passing through the nip in regions in which hooks or projections are formed, specifically reciting all 1-micron increments within the above-recited ranges and all ranges formed therein or thereby.

Unsuccessful Attempts to Provide a Cooling Method

Figure 5:
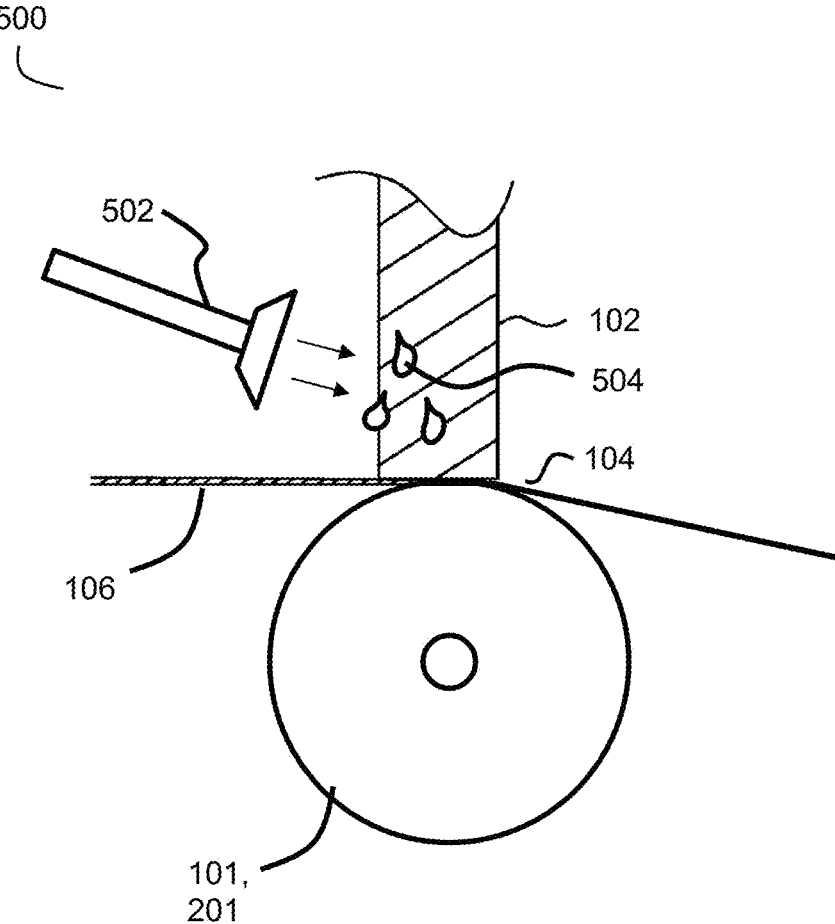
FIG. 5 is a schematic diagram illustrating an example of an unsuccessful air-cooling system.

The hot spot was attempted to be addresses using cold air blasts from a blower to generate an air flow, piping (for cold air), and air blast hoods mounted adjacent the sonotrode. FIG. 5 is schematic diagram illustrating an example of an unsuccessful air-cooling system 500. As illustrated a blower 502 was mounted and directed cold air, represented by arrows, at the second device 102. The present inventors then improved this cooling process with a larger commercial chiller for more cooling capacity, a larger blower for more air velocity to drive the convective heat transfer coefficient, and nozzles which focused the cold air on the hot spot of the sonotrode. This design has worked for line speeds of only about 30 m/min to about 40 m/min, which is not acceptable in absorbent article manufacturing or in other industries. A complication of the cold air blast may be condensation 504 forming on the sonotrode, which drips on the web. The water may interfere with the process and causes holes or tears in the hook patch.

Even after these attempts, a need remained for cooling methods and devices useful for ultrasonic forming and bonding of substrates.

Advantages of Cooling Methods According to Various Embodiments

Various embodiments provide cooling methods and associated devices that solve one or more of the above-mentioned problems.

Various embodiments described herein provide cooling methods that allow for the use of sonotrodes comprising a material having a low thermal conductivity. As used herein, "low thermal conductivity" refers to materials having a thermal conductivity of less than 100, less than 50, or less than 30 W/(m-K), but greater than 5 W/m-K), specifically reciting all 1 W/(m-K) increments within the above-recited ranges and all ranges formed therein or thereby. Some examples of low thermal conductivity materials that may be employed include but are not limited to steel, steel comprising carbon, steel comprising nickel, stainless steel, titanium, and combinations, coatings, or alloys thereof.

Of course, a material having a high thermal conductivity may also be employed, according to any embodiment described herein. As used herein, "high thermal conductivity" refers to materials having a thermal conductivity of greater than or equal to 150, or greater than or equal to 180 W/(m-K), but less than 2000 W/m-K), specifically reciting all 1 W/(m-K) increments within the above-recited ranges and all ranges formed therein or thereby. Some examples high thermal conductivity materials that may be employed include but are not limited to diamond, sapphire, aluminum, copper, bronze, gold, silver, and combinations, coatings, or alloys thereof. Materials such as carbon-carbon composites may also be employed.

Alloying of various materials may, of course, result in a wide range of material densities, which results in different thermal diffusivities. Titanium alloys, useful according to various embodiments, may exhibit thermal diffusivities in a range of from about $1 \times 10^{-6}$ to about $3 \times 10^{-6}$ m²/s. Steels, useful according to various embodiments, may exhibit thermal diffusivities in a range of from about $2 \times 10^{-6}$ to about $4 \times 10^{-6}$ m²/s, specifically reciting all $1 \times 10^{-6}$ m²/s increments within the above-recited ranges and all ranges formed therein or thereby. Aluminum alloys, useful according to various embodiments, may exhibit thermal diffusivities in a range of from about $2 \times 10^{-5}$ to about $9 \times 10^{-5}$ m²/s, specifically reciting all $1 \times 10^{-5}$ m²/s increments within the above-recited ranges and all ranges formed therein or thereby. Copper alloys, useful according to various embodiments, may exhibit thermal diffusivities in a range of from about $5 \times 10^{-5}$ to about $1 \times 10^{-4}$ m²/s, specifically reciting all $1 \times 10^{-4}$ m²/s increments within the above-recited ranges and all ranges formed therein or thereby. Sonotrodes according to various embodiments may comprise a material or only materials having a thermal diffusivity in a range of $1 \times 10^{-6}$ to about $5\times10^{-6}$ m$^2$/s. Heat sinks according to various embodiments may comprise a material or only materials having a thermal diffusivity in a range of $2\times10^{-5}$ to about $2\times10^{-4}$ m$^2$/s, specifically reciting all $1\times10^{-4}$ m$^2$/s increments within the above-recited ranges and all ranges formed therein or thereby.

Upon employing the cooling methods of various embodiments of the present disclosure, a coverage of over 70%, over 75%, over 80%, over 85%, over 90%, over 95%, over 96%, over 97%, over 98%, or over 99%, but less than 100%, specifically reciting all 0.1% increments within the above-recited ranges and all ranges formed therein or thereby, is possible without causing tears, rips, or holes in a substrate. These coverages are possible even at line speeds of about 10 m/min to about 70 m/min, about 10 m/min to about 150 m/min, about 10 m/min to about 400, m/min, about 100 m/min, or about 300 m/min to about 400 m/min, specifically reciting all 1 m/min increments within the above-recited ranges and all ranges formed therein or thereby for ultrasonic forming methods and apparatuses. These coverages and line speeds are possible even when using sonotrodes comprising a material having a high thermal conductivity or a low thermal conductivity as defined herein, including combinations and alloys thereof. Ultrasonic bonding methods and apparatuses, which require less coverage than forming methods and apparatuses may achieve line speeds of about 500 m/min to about 700 m/min, specifically reciting all 1 m/min increments within the above-recited ranges and all ranges formed therein or thereby.

It is to be appreciated that the cooling techniques and apparatuses according to various embodiments may be applied to ultrasonic bonding in general, including applications outside of the nonwoven, film, or absorbent article field. For ultrasonic bonding of nonwovens, burn-through often limits the ultrasonic force and amplitude in bonding applications, which in turn limits the energy input and line rate. Historically, ultrasonic bonding provides excellent bond strength, a soft aesthetic, and flexibility of pattern, but is often limited to rates slower than the 500 m/min to 700 m/min which is common in the absorbent article industry.

Figure 6A:
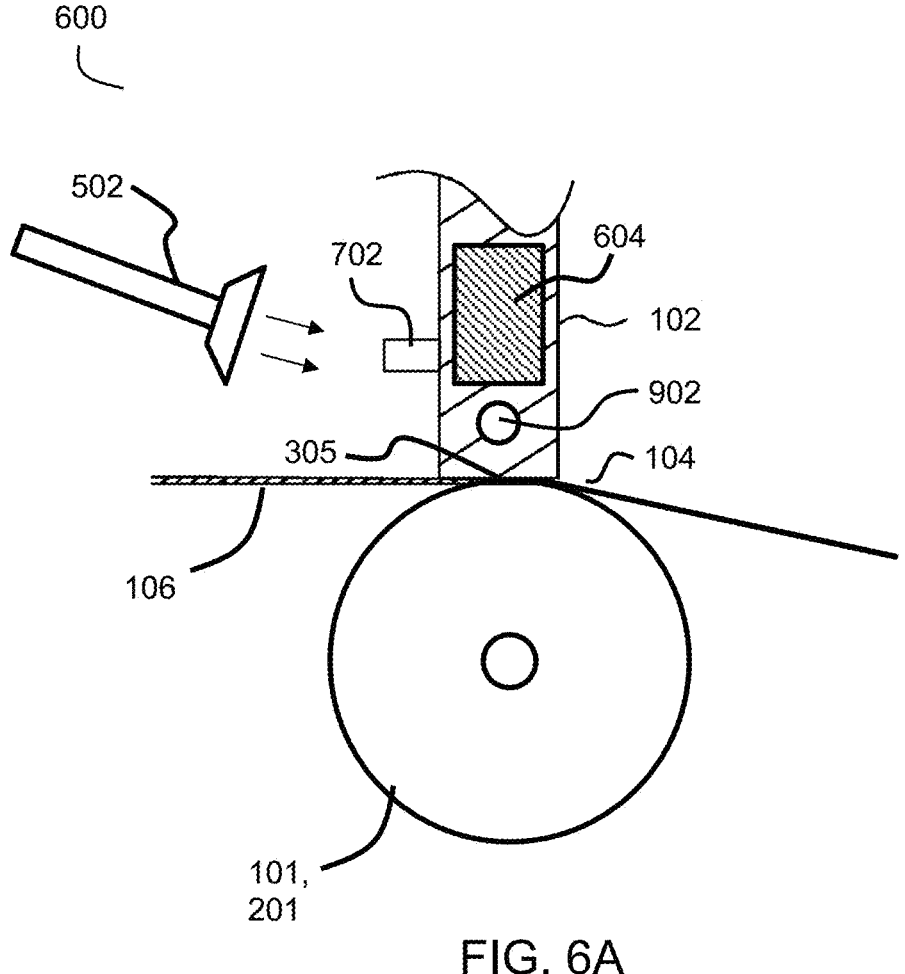
FIG. 6A is an example according to various embodiments illustrating a schematic cross-sectional diagram of a method for manufacturing portions of absorbent articles and an apparatus for altering a substrate for use in an absorbent article.

FIG. 6A is an example according to various embodiments illustrating a schematic cross-sectional diagram of a method for manufacturing portions of absorbent articles and an apparatus for altering a substrate for use in an absorbent article. The method and apparatus may be similar to the method and apparatus illustrated in FIG. 5, however, according to various embodiments, the second device 102 may comprise one or more projections 702 and/or one or more cavities 902. The cavities may extend in the machine direction and/or in the cross direction. A fluid, represented by arrows may be directed at the second device 102 and the one or more projections 702. Additionally or alternatively, a fluid may be conveyed through the one or more cavities 902. In either case, the fluid may help to cool the second device. In comparison to the system illustrated in FIG. 5, the fluid, such as air from a blower 502, may provide the same or similar degree of cooling without causing excessive condensation. Without being bound by theory, this improvement may be due, at least in part, to the increased surface area provided by the one or more projections 702, which allows a warmer fluid to provide the same degree of cooling. The fluid, according to any of these embodiments, may comprise water, air, glycol, a heat transfer oil, combinations thereof, or other suitable cooling fluids. The second device 102 may be covered in whole or in part with insulation 604, such as a foam rubber sheet, paper, or plastic. The insulation 604 may be useful to reduce or to prevent condensation, frost, or ice from accumulating.

Figure 6B:
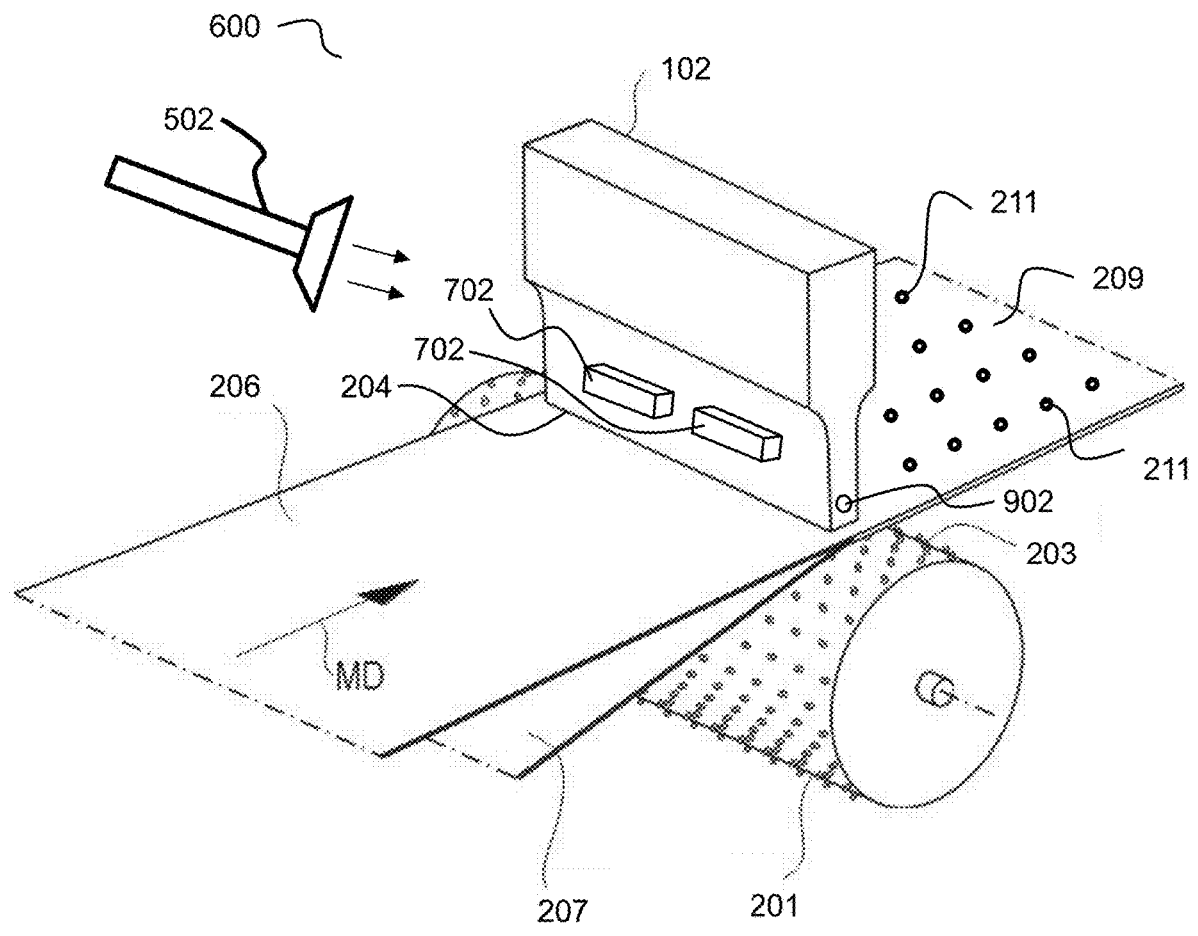
FIG. 6B is an example according to various embodiments illustrating a schematic perspective view of a method for manufacturing portions of absorbent articles and an apparatus for altering a substrate for use in an absorbent article.
Figure 7:
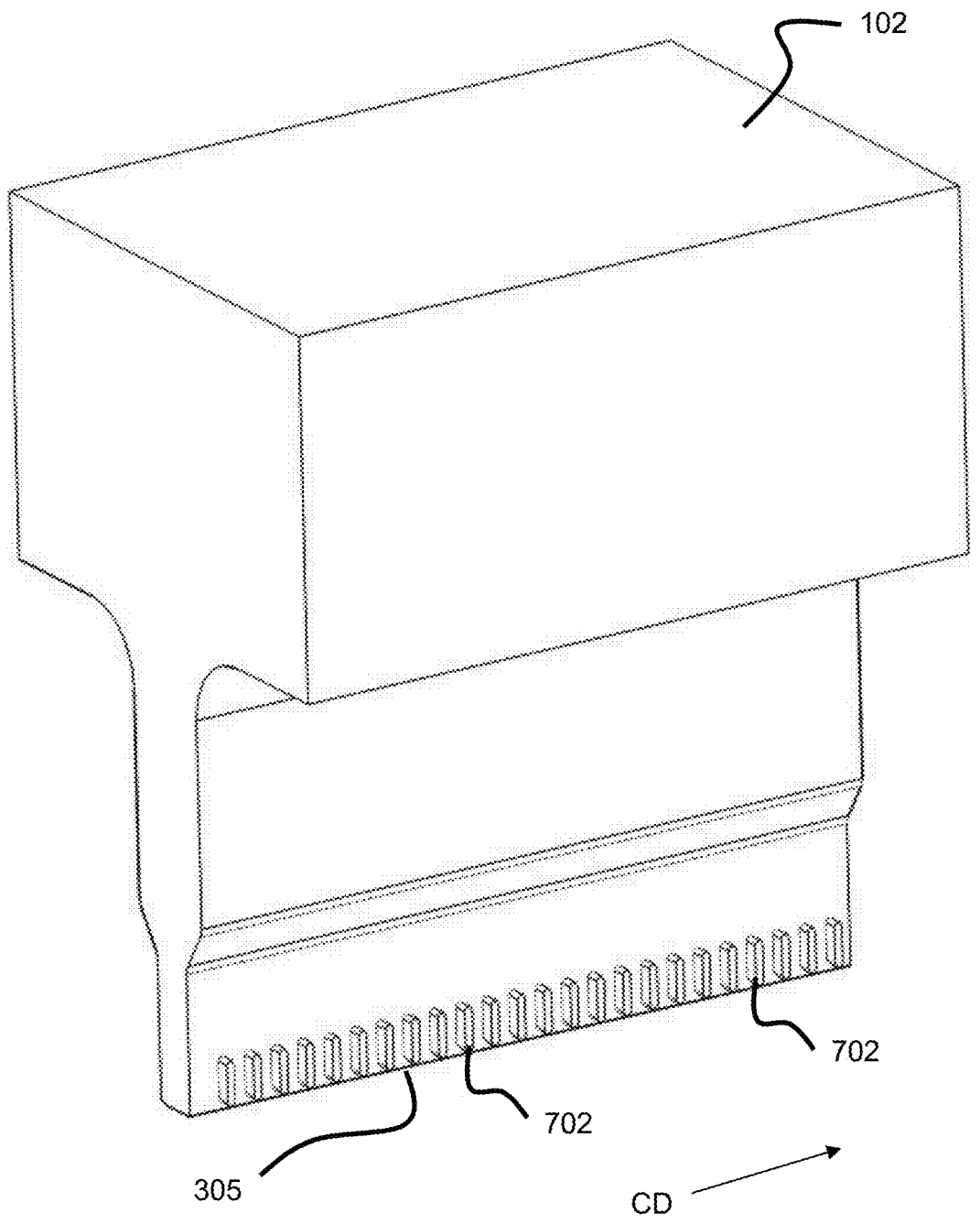
FIG. 7 is an example according to various embodiments illustrating a second device having a plurality of vertical projections disposed thereon proximate to a working surface or contact point of the second device.
Figure 8:
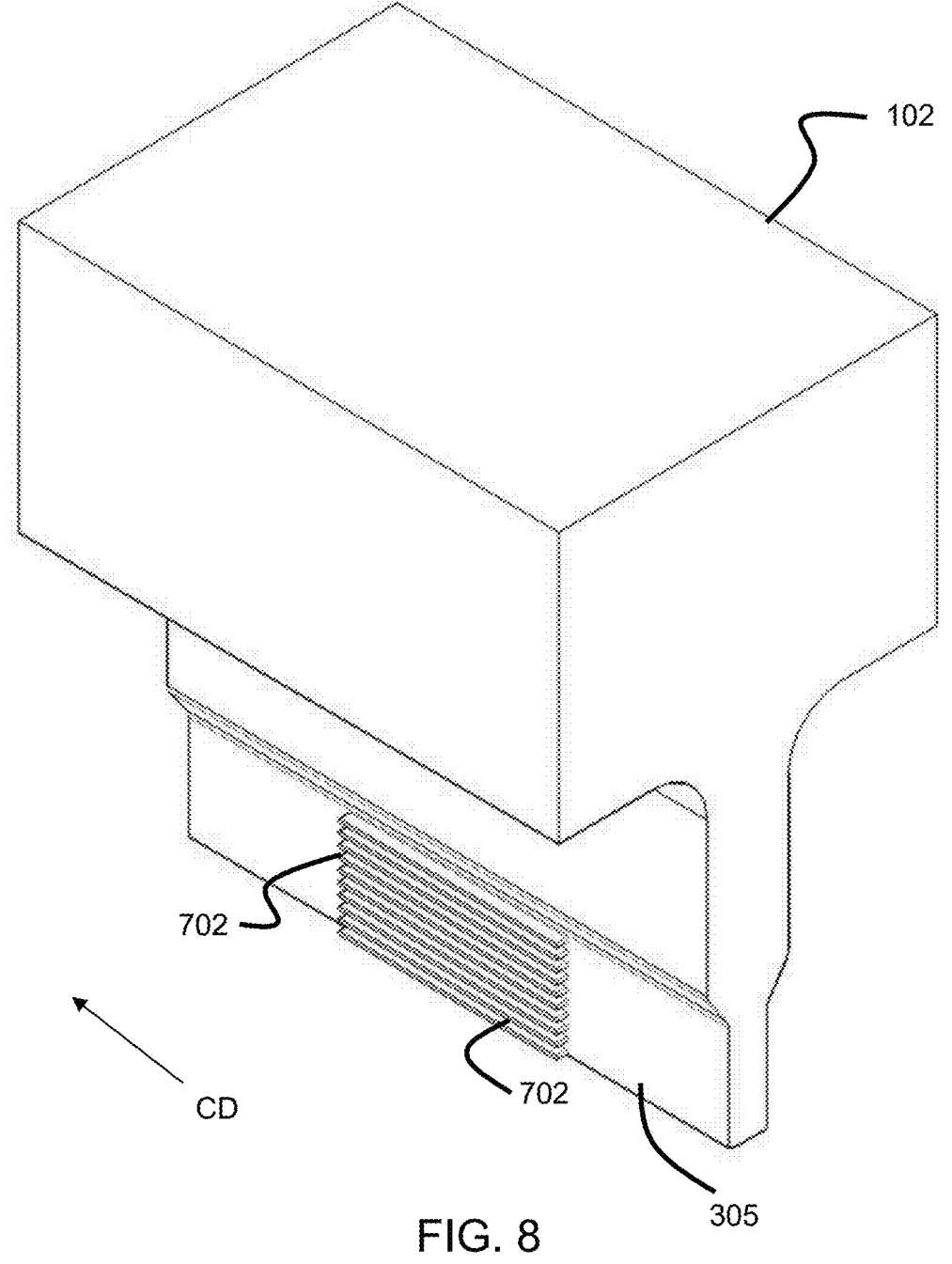
FIG. 8 is an example according to various embodiments illustrating a second device 102 having a plurality of horizontal projections disposed thereon proximate to a working surface or contact point of the second device.

Additionally or alternatively, the method may comprise conveying a first substrate 206 and a second substrate 207 as shown in FIG. 6B through the nip 204. In which case, the step of transmitting vibrational energy from the second device 102 toward the first device 201 via the nip 204 to alter the substrates may comprise bonding the first substrate 206 to the second substrate 207 via a plurality of bonds 211, as already discussed with respect to FIG. 2. All other aspects of the method and the apparatus may be substantially the same. Projection(s) on the Sonotrode FIGS. 7 and 8 are examples according to various embodiments illustrating a second device 102 having a plurality of projections 702 disposed thereon proximate to a working surface or contact point 305 of the second device 102. In FIG. 7, the plurality of projections 702 are vertically-aligned or extend perpendicularly to the cross direction CD. In FIG. 8, the plurality of projections 702 are horizontally aligned or extend in parallel to the cross direction CD. A combination of vertically-aligned and horizontally-aligned projections 702 is also contemplated. Also contemplated are other configurations in which the projections are not vertically or horizontally aligned but which are instead angled or even randomly distributed on the second device 102.

With reference to FIGS. 6A, 6B, 7, and 8, various embodiments relate to a method of manufacturing portions of absorbent articles. The method may comprise conveying a substrate 106 through a nip 104 formed between a first device 101, 201 and a second device 102, transmitting vibrational energy from the second device 102 toward the first device 101, 201 via the nip 104 to alter the substrate 106. The second device 102 may be a sonotrode. The first device 101, 201 may be an anvil roll, such as a rotating anvil. The vibration energy may be ultrasonic energy. The step of transmitting vibrational energy from the second device toward the first device 101 via the nip 104 to alter the substrate 106 may be intermittent or continuous. The method may further comprise providing a plurality of recesses 107, as shown in FIG. 1 in the outer surface of the first device 101. The recesses 107 may have a shape configured to produce projections 109 suitable for use in a touch fastener. The step of transmitting vibrational energy from the second device 102 toward the first device 102 via the nip 104 to alter the substrate 106 may comprise locally softening a portion of the substrate 106 to force a portion of the softened material into the recesses 107 to form projections 109 suitable for use in a touch fastener. It is to be appreciated that the method may further comprise providing a second projection 702 extending from the second device 102 or any number of projections 702. The second projection 702 may be in thermal communication with the second device 102 and may be positioned proximate to a working surface or contact point 305 of the second device 102. Without being bound by theory, positioning the one or more projections near the contact point 305 may help alleviate the localized overheating previously discussed. Indeed, the method may further comprise cooling the second device 102 by transferring thermal energy from the second device 102 to the second projection 702 and conveying a chilled fluid over the second projection 702 to cool the second projection 102.

Similarly, various embodiments relate to an apparatus 600 for altering a substrate 106 for an absorbent article. The apparatus 600 may comprise a first device 101, 201, a second device 102 configured to transmit vibrational energy toward a nip 104 formed between the second device 102 and the first device 101, and a projection 702 extending from the second device 102. The projection 702 may be in thermal communication with the second device 102 and may be positioned proximate to a working surface or contact point 305 of the second device 102, where the localized heating was unexpectedly discovered, and which is illustrated in FIG. 3. Indeed, the projection 702 may be configured to cool the working surface or contact point 305 of the second device while a substrate 106 is conveyed through the nip 104 to be altered by the vibrational energy. The apparatus 600 may further comprise a second projection 702 extending from the second device 102. The second projection 702 may be in thermal communication with the second device 102 and, as discussed with respect to the method embodiments, may be positioned proximate to a working surface or contact point 305 of the second device 102. The second projection 702 may be configured to cool the working surface or contact point 305 of the second device 102 while the substrate 106 is conveyed through the nip 104 to be altered by the vibrational energy.

The projection or projections, according to various embodiments, may be in thermal communication with the second device. As used herein, two bodies in "thermal communication" are configured such that if one of the two bodies loses heat, the other body may gain at least a portion of that heat.

The projection(s) may be integral with the second device or separable from the second device. For example, the projection(s) may be joined to a portion of the second device. The projection(s) may comprise the same material or a different material than a primary material of the second device. The projection(s) may comprise a material having a high thermal conductivity as described herein or the projection(s) may comprise a material having a low thermal conductivity as described herein. According to various embodiments, the projection(s) may comprise a material that has a higher thermal conductivity than the primary material of the second device. For example, the projection(s) may comprise aluminum or brass, thereby providing a higher thermal conductivity than a second device primarily comprising titanium. In this context the term "primary material" refers to the material that constitutes the majority of the relevant regions of the second device 102 or to the material that most influences the overall thermal conductivity of the relevant regions of the second device 102. The relevant regions of the second device 102 are the regions that need to be cooled, for example, the areas of the second device 102 in which a localized overheating or deformation is to be reduced or prevented, including but not limited to the working surface or contact point 305.

Cavity in the Sonotrode

With reference to FIGS. 6A, 6B, 9A, 9B, 9C, 10A, 10B, and 10C, in addition to or as an alternative to providing one or more projections 702, various embodiments may comprise providing one or more cavities 902, 912 in the second device 102 proximate to a working surface or contact point 305 of the second device 102. A fluid may be conveyed through the cavity to cool the second device 102 by transferring thermal energy from the second device 102 to the fluid. The fluid may comprise water, air, glycol, or any suitable heat transfer fluid or oil. The fluid type may be chosen to avoid cavitation. The fluid may be filtered to remove impurities which may cause cavitation. The fluid may be pressurized to prevent or minimize cavitation. The fluid may be chilled. The fluid may be chilled to −80° C. to 20° C., −25° C. to 20° C., −24° C. to 5° C., or −16° C. to +1° C., specifically reciting all 1° C. increments within the specified ranges and all ranges formed therein or thereby. The fluid may be chilled within 5° C., or 2° C., of the localized dew point. The one or more cavities 902, 912 may be positioned at a location proximate to the working surface or contact point 305 of the second device 305. The location proximate to the working surface or contact point may be within about 0.1 mm to about 25 mm, or within about 0.5 mm to about 15 mm from the working surface, specifically reciting all 0.1 mm increments within the specified ranges and all ranges formed therein or thereby.

Figure 9A:
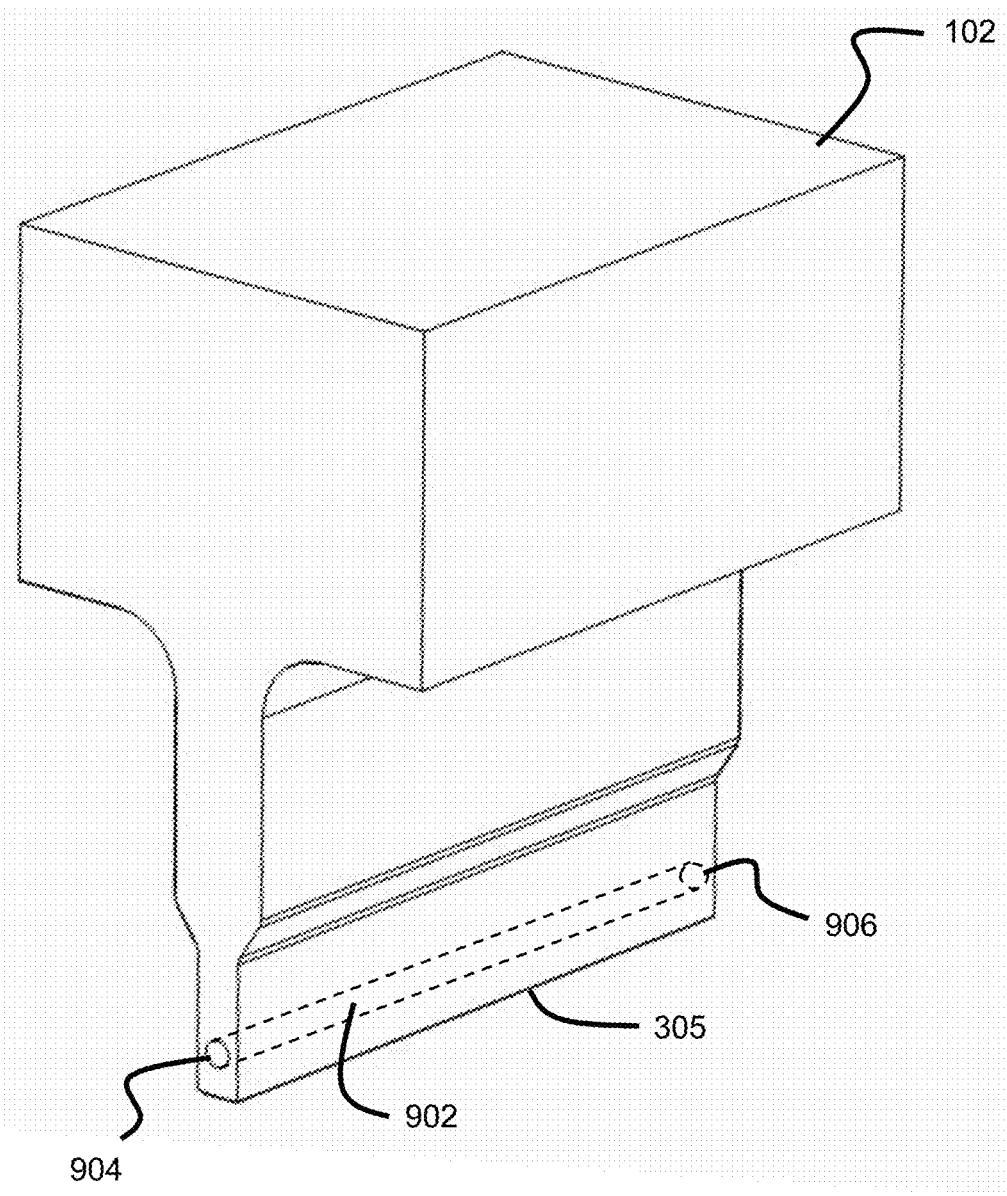
FIG. 9A is an example according to various embodiments illustrating a second device having a cavity through which a fluid may be conveyed to cool the second device.

FIG. 9A is an example according to various embodiments illustrating a second device 102 having a cavity 902 through which a fluid may be conveyed to cool the second device 102. The cavity 902 may have a first port 904 and a second port 906.

Figure 9B:
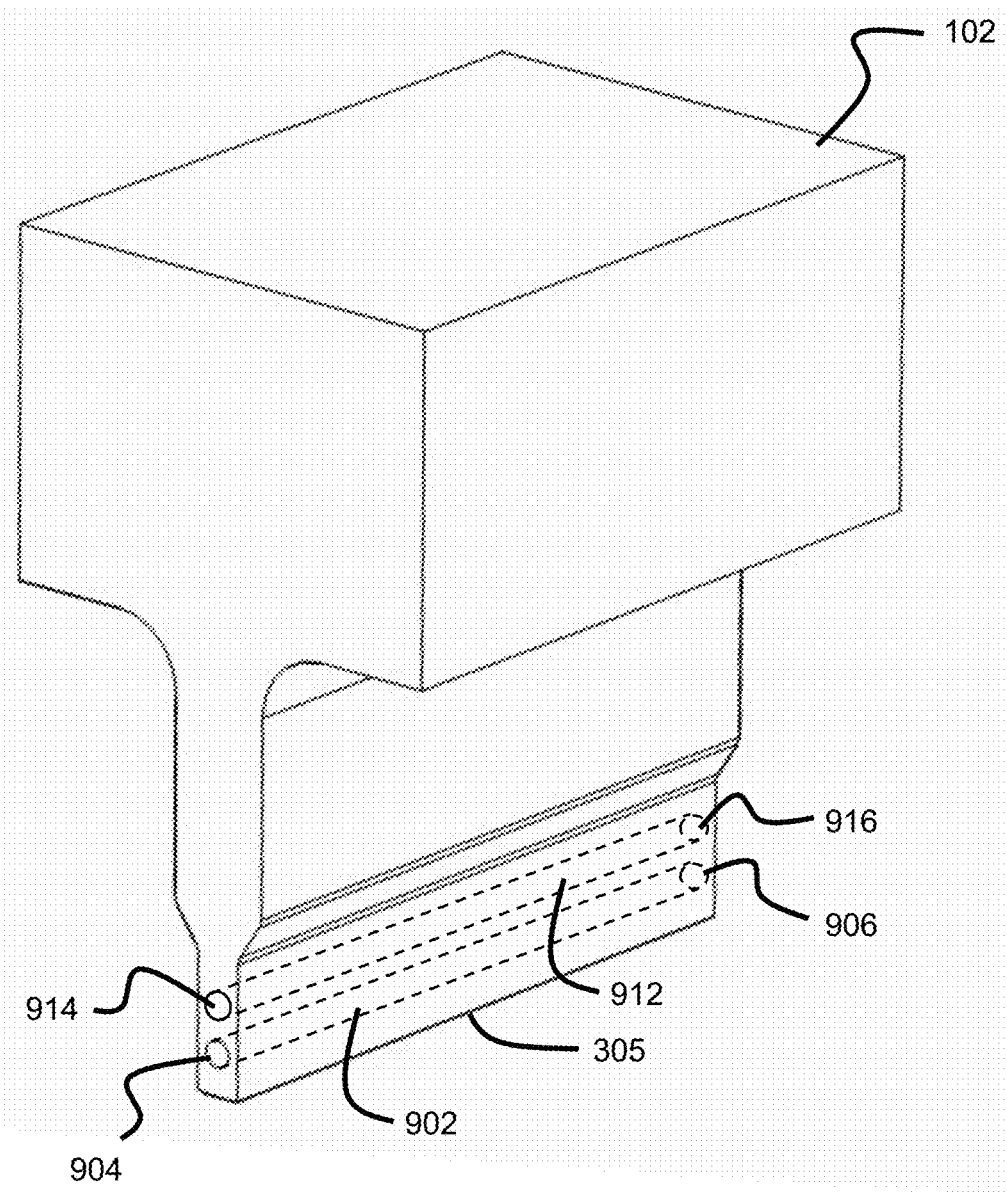
FIG. 9B is an example according to various embodiments illustrating a second device having a plurality of cavities through which a fluid may be conveyed to cool the second device.

FIG. 9B is an example according to various embodiments illustrating a second device 102 having a plurality of cavities 902, 912 through which a fluid may be conveyed to cool the second device 102. The plurality of cavities may comprise a first cavity 902 having a first port 904 and a second port 906 and a second cavity 912 having a third port 914 and a second port 916.

Figure 9C:
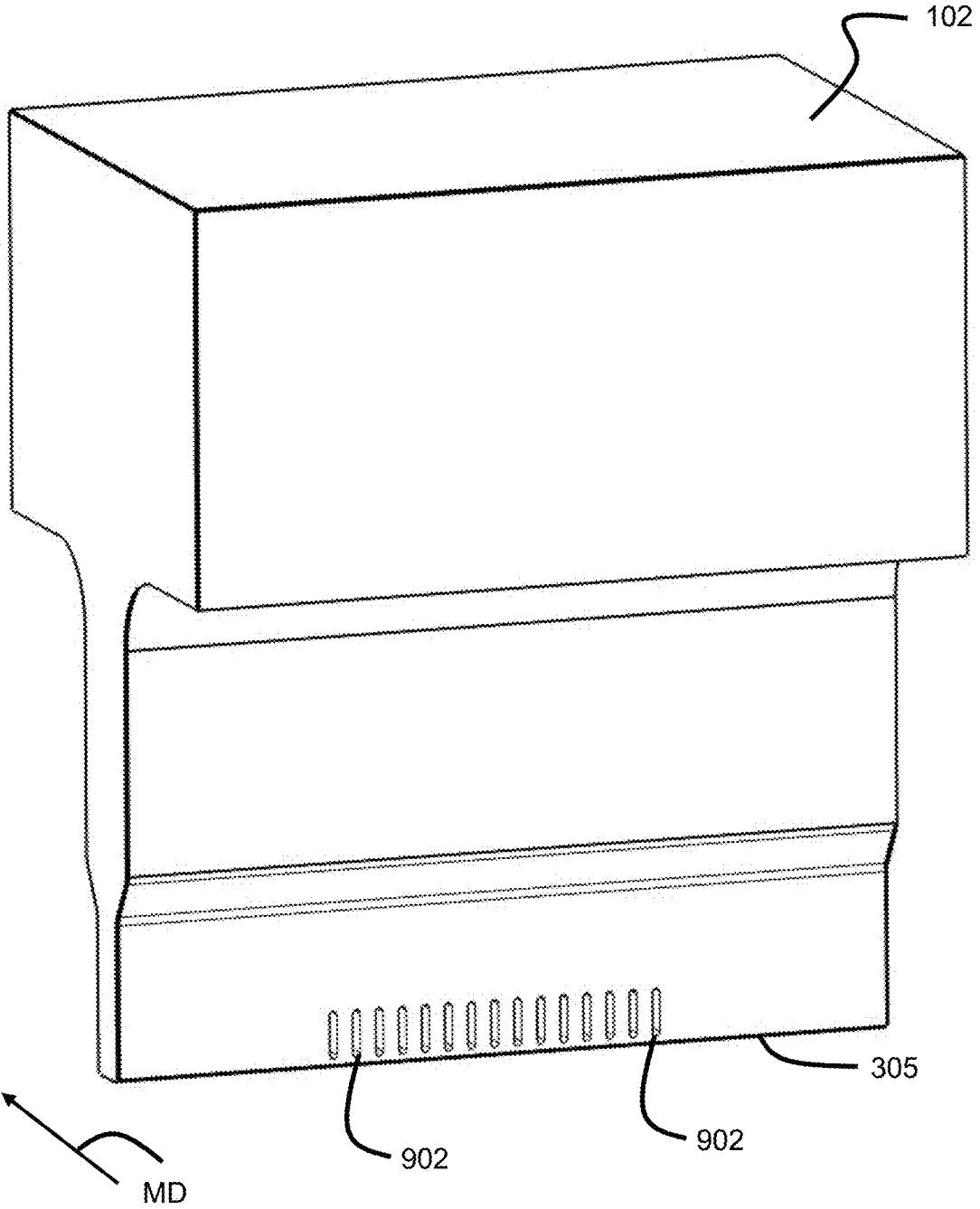
FIG. 9C is an example according to various embodiments illustrating a second device having a plurality of cavities oriented in a machine direction.

FIG. 9C is an example according to various embodiments illustrating a second device 102 having a plurality of cavities 902 oriented in a machine direction. A fluid may be conveyed through one or more of the plurality of cavities 902 to cool the second device 102 by transferring thermal energy from the second device 102 to the fluid. The plurality of cavities 902 may be disposed at a location proximate to a working surface or contact point 305 of the second device 102. The fluid may comprise water, air, glycol, or any suitable heat transfer fluid or oil.

Figure 10A:
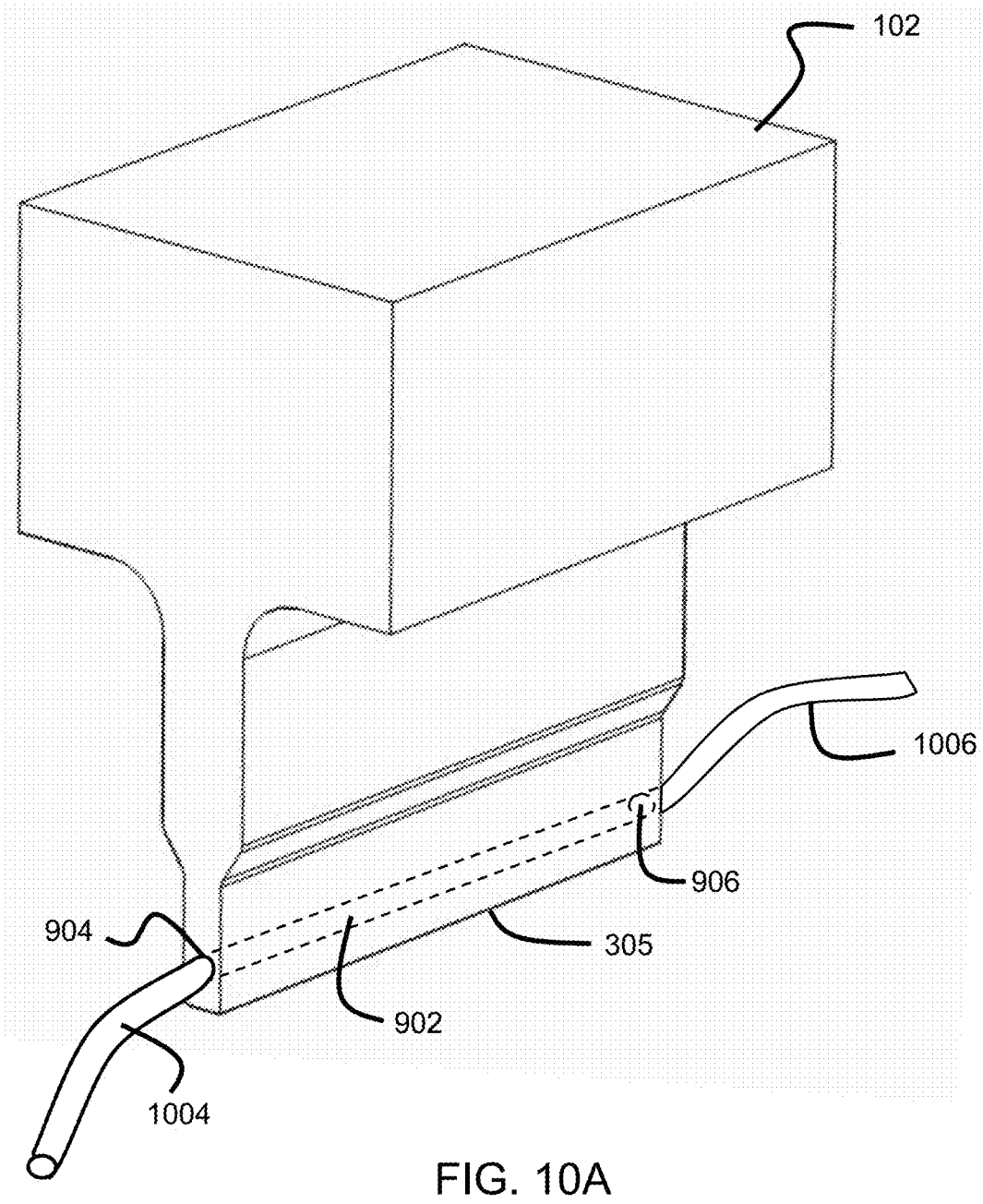
FIG. 10A is an example according to various embodiments illustrating the second device shown in FIG. 9A with ports attached to tubing for conveying a fluid through the cavity.

The method according to various embodiments may further comprise conveying a fluid through the cavity or cavities and cooling the second device 102 by transferring thermal energy from the second device to the fluid. FIG. 10A is an example according to various embodiments illustrating the second device 102 shown in FIG. 9A with ports attached to tubing for conveying a fluid through the cavity 902. More specifically, a first section of tubing 1004 may be attached to the first port 904, which may serve as an inlet or an outlet for the fluid. Similarly, a second section of tubing 1006 may be attached to the second port 906, which may serve as an inlet or an outlet for the fluid.

Figure 10B:
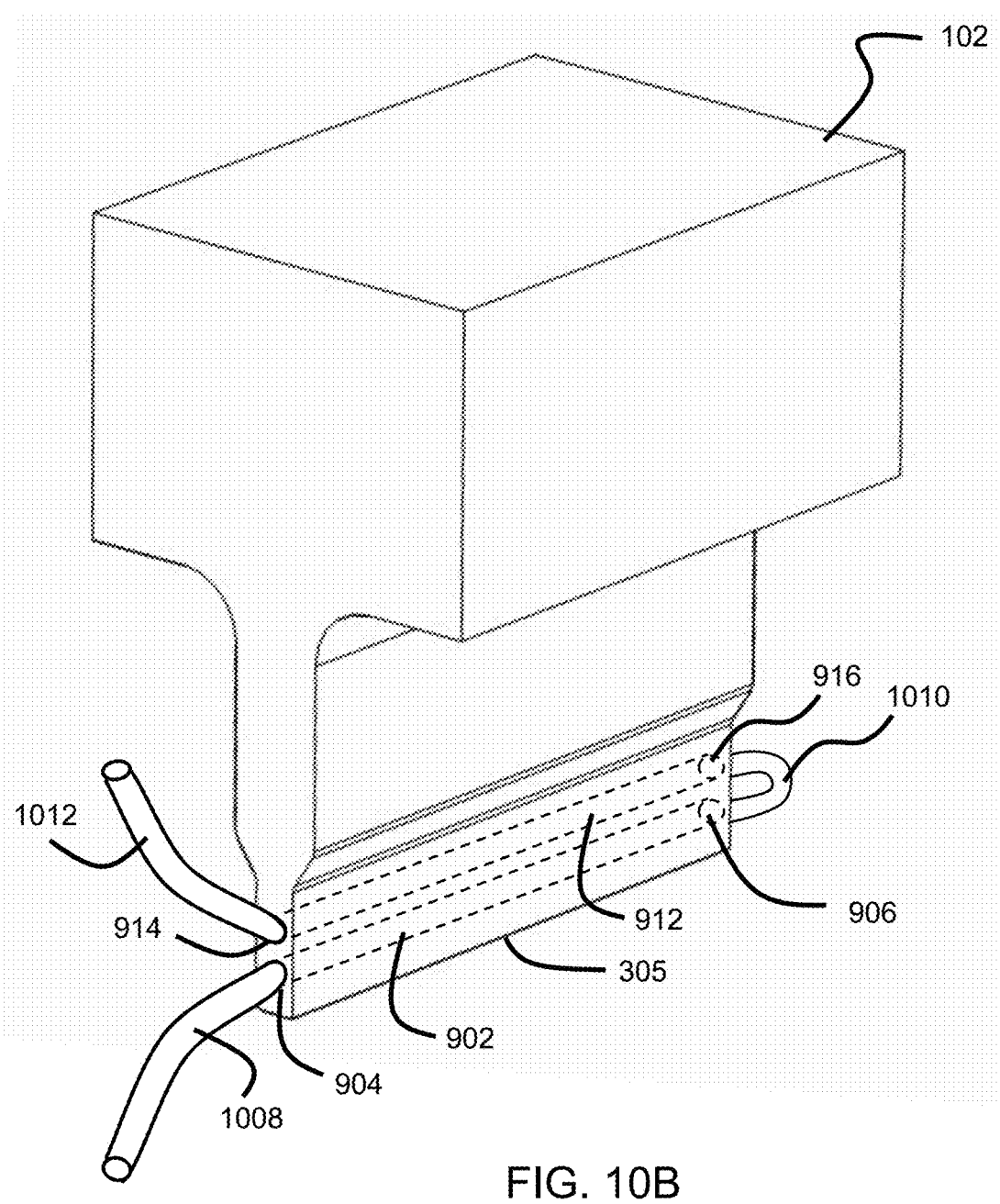
FIG. 10B is an example according to various embodiments illustrating the second device shown in FIG. 9B with ports attached to tubing for conveying a fluid through the cavities.

FIG. 10B is an example according to various embodiments illustrating the second device 102 shown in FIG. 9B, having a first cavity 902 and a second cavity 912 with ports attached to tubing for conveying a fluid through the cavities. More specifically, the first port 904 may be connected to a first section of tubing 1008 and may function as an inlet to the first cavity 902. The second port 906 may be connected to a second section of tubing 1010, which may redirect the fluid to the fourth port 916 to enter the second cavity 912. The third port 914 may be connected to a third section of tubing 1012 and may function as an outlet to the second cavity 912. It is to be understood that the fluid may flow in the opposite direction with the third port 914 functioning as the inlet and the first port 904 functioning as the outlet. It is to be appreciated that any number of cavities may be employed and similarly connected to convey fluid circuitously through the second device 102.

Figure 10C:
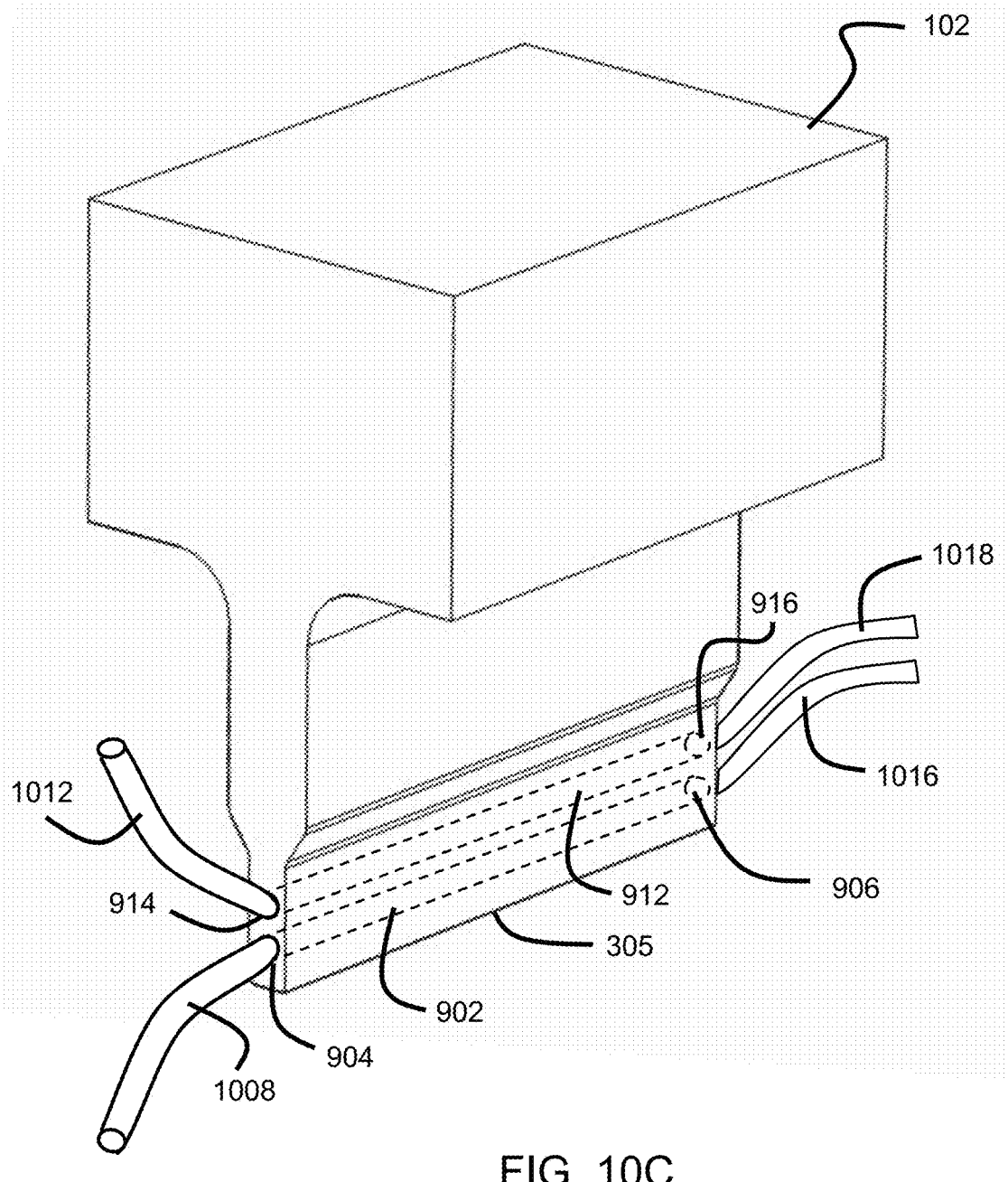
FIG. 10C is an example according to various embodiments illustrating the second device shown in FIG. 9B, having a first cavity and a second cavity with ports attached to tubing for conveying a fluid through the cavities in a different configuration.

FIG. 10C is an example according to various embodiments illustrating the second device 102 shown in FIG. 9B, having a first cavity 902 and a second cavity 912 with ports attached to tubing for conveying a fluid through the cavities. More specifically, the first port 904 may be connected to a first section of tubing 1008 and may function as an inlet or as an outlet to the first cavity 902. The second port 906 may be connected to a second section of tubing 1016 and may function as an inlet or as an outlet to the first cavity 902. The third port 914 may be connected to a third section of tubing 1012 and may function as an inlet or as an outlet to the second cavity 912. The fourth port 916 may be connected to a fourth section of tubing 1018 and may function as an inlet or as an outlet to the second cavity 912. It is to be appreciated that any number of cavities may be employed and similarly connected to convey fluid in a plurality of directions through the second device 102. The plurality of directions may be the same or different.

Substrate Materials

Any of the substrates described herein may comprise one or more layers of one or more nonwoven materials, one or more films, combinations of different nonwoven materials, combinations of different films, combinations of one or more films and one or more nonwoven materials, or combinations of one or more different materials, for example, depending on the specific purpose for which they are intended. The substates may comprise spunbond, meltblown, or carded materials. The substrates may also comprise polyethylene films. The nonwoven substates may or may not be hydroentangled.

Some substrates for nonwoven materials may comprise PE/PP bicomponent fiber spunbond substates. Other suitable substrates may comprise spunbond substrates comprising side-by-side crimped fibers (e.g., PE/PP or PP/PP) that are bonded via calendar (thermal point) bonding or through-air bonding. Other suitable substrates may comprise carded, through-air bonded or resin bonded (highloft) nonwovens comprising PE/PP or PE/PET fibers. The substates may comprise microfibers and/or nanofibers, optionally with other fibers. In some circumstances, multiple layer substates may be desired over a single layer substates (even at the same basis weight) due to increased uniformity/opacity and the ability to combine substates having different properties. The layers may have the same or different surface energy.

Fibers of the substrates may comprise any suitable thermoplastic polymers. Example thermoplastic polymers are polymers that melt and then, upon cooling, crystallize or harden, but that may be re-melted upon further heating. Suitable thermoplastic polymers may have a melting temperature (also referred to as solidification temperature) from about 60° C. to about 300° C., from about 80° C. to about 250° C., or from about 100° C. to about 215° C., specifically reciting all 0.5° C. increments within the specified ranges and all ranges formed therein or thereby. And, the molecular weight of the thermoplastic polymer may be sufficiently high to enable entanglement between polymer molecules and yet low enough to be melt spinnable.

The thermoplastic polymers may be derived from any suitable material including renewable resources (including bio-based and recycled materials), fossil minerals and oils, and/or biodegradable materials. Some suitable examples of thermoplastic polymers include polyolefins, polyesters, polyamides, copolymers thereof, and combinations thereof. Some example polyolefins include polyethylene or copolymers thereof, including low density, high density, linear low density, or ultra-low density polyethylenes.

The thermoplastic polymer component may be a single polymer species or a blend of two or more thermoplastic polymers e.g., two different polypropylene resins. As an example, fibers of a first nonwoven layer of a substrate may comprise polymers such as polypropylene and blends of polypropylene and polyethylene, while a second nonwoven layer of the substate may comprise fibers selected from polypropylene, polypropylene/polyethylene blends, and polyethylene/polyethylene terephthalate blends. In some forms, the second nonwoven layer may comprise fibers selected from cellulose rayon, cotton, other hydrophilic fiber materials, or combinations thereof.

The fibers of the layer of the substrate may comprise monocomponent fibers, bi-component fibers, and/or bi-constituent fibers, round fibers or non-round fibers (e.g., capillary channel fibers), and may have major cross-sectional dimensions (e.g., diameter for round fibers) ranging from about 0.1 microns to about 500 microns. The fibers may also be a mixture of different fiber types, differing in such features as chemistry (e.g. polyethylene and polypropylene), components (mono- and bi-), denier (micro denier and >2 denier), shape (i.e. capillary and round) and the like. The fibers may range from about 0.1 denier to about 100 denier.

Example substrates are contemplated where a first plurality of fibers and/or a second plurality of fibers comprise additives in addition to their constituent chemistry. For example, suitable additives include additives for coloration, antistatic properties, lubrication, softness, hydrophilicity, hydrophobicity, and the like, and combinations thereof.

As used herein, the term "monocomponent fiber(s)" refers to a fiber formed from one extruder using one or more polymers. This is not meant to exclude fibers formed from one polymer to which small amounts of additives have been added for coloration, antistatic properties, lubrication, hydrophilicity, etc.

As used herein, the term "bi-component fiber(s)" refers to fibers which have been formed from at least two different polymers extruded from separate extruders but spun together to form one fiber. Bi-component fibers are also sometimes referred to as conjugate fibers or multicomponent fibers. The polymers are arranged in substantially constantly positioned distinct zones across the cross-section of the bi-component fibers and extend continuously along the length of the bi-component fibers. The configuration of such a bi-component fiber may be, for example, a sheath/core arrangement where one polymer is surrounded by another or may be a side-by-side arrangement, eccentric arrangements, a pie arrangement, or an "islands-in-the-sea" arrangement. Some specific examples of fibers which may be used in the first nonwoven layer include polyethylene/polypropylene side-by-side bi-component fibers. Another example is a polypropylene/polyethylene bi-component fiber where the polyethylene is configured as a sheath and the polypropylene is configured as a core within the sheath. Still another example is a polypropylene/polypropylene bi-component fiber where two different propylene polymers are configured in a side-by-side configuration. Additionally, forms are contemplated where the fibers of a nonwoven layer are crimped.

Bi-component fibers may comprise two different resins, e.g., a first polypropylene resin and a second polypropylene resin. The resins may have different melt flow rates, molecular weights, or molecular weight distributions.

As used herein, the term "bi-constituent fiber(s)" refers to fibers which have been formed from at least two polymers extruded from the same extruder as a blend. Bi-constituent fibers do not have the various polymer components arranged in relatively constantly positioned distinct zones across the cross-sectional area of the fiber and the various polymers are usually not continuous along the entire length of the fiber, instead usually forming fibrils which start and end at random. Bi-constituent fibers are sometimes also referred to as multi-constituent fibers. In other examples, a bi-component fiber may comprise multiconstituent components.

As used herein, the term "non-round fiber(s)" describes fibers having a non-round cross-section and includes "shaped fibers" and "capillary channel fibers." Such fibers may be solid or hollow, and they may be tri-lobal, delta-shaped, and may be fibers having capillary channels on their outer surfaces.

Other example nonwoven materials for the substates may comprise spunlace materials, needle punched materials, wet-laid materials, or air-laid materials, for example.

Examples/Combinations

1. An apparatus for altering a substrate for an absorbent article, comprising:
   a first device;
   a second device configured to transmit vibrational energy toward a nip formed between the second device and the first device; and
   a projection extending from the second device, wherein the projection is in thermal communication with the second device and is positioned proximate to a working surface of the second device, and wherein the projection is configured to cool a working surface of the second device while a substrate is conveyed through the nip to be altered by the vibrational energy.
2. The apparatus of paragraph 1, wherein the projection comprises a different material than a primary material of the second device.
3. The apparatus of paragraph 1, wherein the projection comprises the same material as a primary material of the second device.
4. The apparatus of any one of paragraphs 1 to 2, wherein the projection is integral with the second device.
5. The apparatus of any one of paragraphs 1 to 2, wherein the projection is joined to a portion of the second device.
6. The apparatus of any one of paragraphs 1 to 5, wherein the second device is a sonotrode, wherein the first device is a rotating anvil, and wherein the vibration energy is ultrasonic energy.
7. The apparatus of any one of paragraphs 1 to 6, wherein an outer surface of the first device defines a plurality of recesses, and wherein the recesses have a shape configured to produce projections in the substrate that are suitable for use in a touch fastener.
8. The apparatus of any one of paragraphs 1 to 6, wherein an outer surface of the first device comprises bonding nubs to produce bonds in the substrate.
9. The apparatus of any one of paragraphs 1 to 8, comprising:
   a second projection extending from the second device, wherein the second projection is in thermal communication with the second device and is positioned at the location proximate to a working surface of the second device, and wherein the second projection is configured to cool a working surface of the second device while the substrate is conveyed through the nip to be altered by the vibrational energy.
10. The apparatus of any one of paragraphs 1 to 9, comprising a cavity in the second device proximate to the working surface of the second device, wherein the cavity is configured to convey a chilled fluid through the second device to cool the working surface of the second device while the substrate is conveyed through the nip to be altered by the vibrational energy.

11. An apparatus for altering a substrate for an absorbent article, comprising:
    a first device;
    a second device configured to transmit vibrational energy toward a nip formed between the second device and the first device; and
    a cavity in the second device proximate to a working surface of the second device, wherein the cavity is configured to convey a chilled fluid through the second device to cool a working surface of the second device while a substrate is conveyed through the nip to be altered by the vibrational energy.
12. The apparatus of paragraph 11, wherein the location proximate to the working surface is within about 0.5 mm to about 15 mm from the working surface.
13. The apparatus of paragraphs 11 or 12, wherein the second device is a sonotrode, and wherein the vibration energy is ultrasonic energy.
14. The apparatus of any one of paragraphs 11 to 13, wherein an outer surface of the first device defines a plurality of recesses, and wherein the recesses have a shape configured to produce projections in the substrate that are suitable for use in a touch fastener.
15. The apparatus of any one of paragraphs 11 to 13, wherein an outer surface of the first device comprises bonding nubs to produce bonds in the substrate.
16. The apparatus of any one of paragraphs 11 to 15, comprising
    providing a second cavity in the second device proximate to the working surface of the second device, wherein the cavity is configured to convey a chilled fluid through the second device to cool the working surface of the second device while the substrate is conveyed through the nip to be altered by the vibrational energy.
17. The apparatus of any one of paragraphs 11 to 16, comprising a projection extending from the second device, wherein the projection is in thermal communication with the second device and is positioned proximate to the working surface of the second device, and wherein the projection is configured to cool the working surface of the second device while the substrate is conveyed through the nip to be altered by the vibrational energy.

Examples/Combinations

1. A method of manufacturing portions of absorbent articles comprising:
   conveying a substrate through a nip formed between a first device and a second device;
   transmitting vibrational energy from the second device toward the first device via the nip to alter the substrate;
   providing a projection extending from the second device, wherein the projection is in thermal communication with the second device, and wherein the projection is positioned proximate to a working surface of the second device;
   cooling the second device by transferring thermal energy from the second device to the projection; and
   conveying a chilled fluid over the projection to cool the projection.
2. The method of paragraph 1, wherein the step of cooling the second device comprises cooling the second device at a location that is within about 0.5 mm to about 15 mm from the working surface.

3. The method of paragraph 1 or 2, wherein the chilled fluid comprises water, air, oil, or glycol.

4. The method of any one of paragraphs 1 to 3, wherein the projection comprises a different material than a primary material of the second device.

5. The method of any one of paragraphs 1 to 3, wherein the projection comprises the same material as a primary material of the second device.

6. The method of any one of paragraphs 1 to 5, wherein the projection is integral with the second device.

7. The method of any one of paragraphs 1 to 5, wherein the projection is joined to a portion of the second device.

8. The method of any one of paragraphs 1 to 7, wherein the second device is a sonotrode, wherein the first device is a rotating anvil, and wherein the vibration energy is ultrasonic energy.

9. The method of any one of paragraphs 1 to 8, comprising providing a plurality of recesses in an outer surface of the first device, and wherein the recesses have a shape configured to produce projections suitable for use in a touch fastener.

10. The method of any one of paragraphs 1 to 9, wherein the step of transmitting vibrational energy from the second device toward the first device via the nip to alter the substrate comprises locally softening a portion of the substrate to force a portion of the softened material into the recesses to form projections suitable for use in a touch fastener.

11. The method of any one of paragraphs 1 to 9, comprising conveying a second substrate through the nip, and wherein the step of transmitting vibrational energy from the second device toward the first device via the nip to alter the substrate comprises bonding the substrate to the second substrate.

12. The method of any one of paragraphs 1 to 11, wherein the step of transmitting vibrational energy from the second device toward the first device via the nip to alter the substrate is intermittent.

13. The method of any one of paragraphs 1 to 12, comprising:
   providing a second projection extending from the second device, wherein the second projection is in thermal communication with the second device and is positioned proximate to the working surface of the second device;
   cooling the second device by transferring thermal energy from the second device to the second projection; and
   conveying the chilled fluid over the second projection to cool the second projection.

14. The method of any one of paragraphs 1 to 13, comprising:
   providing a cavity in the second device proximate to the working surface of the second device;
   conveying a chilled fluid through the cavity; and
   cooling the second device by transferring thermal energy from the second device to the chilled fluid.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing portions of absorbent articles comprising:
   conveying a substrate through a nip formed between a first device and a second device;
   transmitting vibrational energy from the second device toward the first device via the nip to alter the substrate;
   providing a projection extending from the second device, wherein the projection is in thermal communication with the second device, and wherein the projection is positioned proximate to a working surface of the second device;
   providing insulation on at least part of the second device to reduce condensation, frost, and/or ice accumulation;
   cooling the second device by transferring thermal energy from the second device to the projection; and
   conveying a chilled fluid over the projection to cool the projection.

2. The method of claim 1, wherein the step of cooling the second device comprises cooling the second device at a location that is within about 0.5 mm to about 15 mm from the working surface.

3. The method of claim 1, wherein the chilled fluid comprises water, air, oil, or glycol.

4. The method of claim 1, wherein the projection comprises a different material than a primary material of the second device.

5. The method of claim 1, wherein the projection comprises the same material as a primary material of the second device.

6. The method of claim 1, wherein the projection is integral with the second device.

7. The method of claim 1, wherein the projection is joined to a portion of the second device.

8. The method of claim 1, wherein the second device is a sonotrode, wherein the first device is a rotating anvil, and wherein the vibration energy is ultrasonic energy.

9. The method of claim 1, comprising providing a plurality of recesses in an outer surface of the first device, wherein the recesses have a shape configured to produce projections suitable for use in a touch fastener, and wherein the step of transmitting vibrational energy from the second device toward the first device via the nip to alter the substrate comprises locally softening a portion of the substrate to force a portion of the softened material into the recesses to form projections suitable for use in a touch fastener.

10. The method of claim 1, comprising conveying a second substrate through the nip, and wherein the step of transmitting vibrational energy from the second device toward the first device via the nip to alter the substrate comprises bonding the substrate to the second substrate.

11. The method of claim 1, wherein the step of transmitting vibrational energy from the second device toward the first device via the nip to alter the substrate is intermittent.

12. The method of claim 1, comprising:

providing a second projection extending from the second device, wherein the second projection is in thermal communication with the second device and is positioned proximate to the working surface of the second device;

cooling the second device by transferring thermal energy from the second device to the second projection; and conveying the chilled fluid over the second projection to cool the second projection.

13. The method of claim 1, comprising:

providing a cavity in the second device proximate to the working surface of the second device;

conveying a chilled fluid through the cavity; and cooling the second device by transferring thermal energy from the second device to the chilled fluid.

14. A method of manufacturing portions of absorbent articles comprising:

conveying a substrate through a nip formed between a first device and a second device;

transmitting vibrational energy from the second device toward the first device via the nip to alter the substrate;

providing a cavity in the second device proximate to a working surface of the second device;

providing insulation on at least part of the second device to reduce condensation, frost, and/or ice accumulation;

conveying a chilled fluid through the cavity; and cooling the second device by transferring thermal energy from the second device to the chilled fluid.

15. The method of claim 14, wherein the step of cooling the second device comprises cooling the second device at a location that is within about 0.5 mm to about 15 mm from the working surface.

16. The method of claim 14, wherein the second device is a sonotrode, and wherein the vibration energy is ultrasonic energy.

17. The method of claim 14, comprising providing a plurality of recesses in the outer surface of the first device, wherein the recesses have a shape configured to produce projections suitable for use in a touch fastener, and wherein the step of transmitting vibrational energy from the second device toward the first device via the nip to alter the substrate comprises locally softening a portion of the substrate to force a portion of the softened material into the recesses to form projections suitable for use in a touch fastener.

18. The method of claim 14, comprising conveying a second substrate through the nip, wherein the step of transmitting vibrational energy from the second device toward the first device via the nip to alter the substrate comprises bonding the substrate to the second substrate.

19. The method of claim 14, wherein the step of transmitting vibrational energy from the second device toward the first device via the nip to alter the substrate is intermittent.

20. The method of claim 14, comprising:

providing a second cavity in the second device proximate to the working surface of the second device;

conveying the chilled fluid through the second cavity; and cooling the second device by transferring thermal energy from the second device to the chilled fluid.

21. The method of claim 14, comprising providing a projection extending from the second device, wherein the projection is in thermal communication with the second device and is positioned proximate to the working surface of the second device; and cooling the second device by transferring thermal energy from the second device to the projection.

* * * * *